US010921518B2

(12) United States Patent
Barwicz

(10) Patent No.: US 10,921,518 B2
(45) Date of Patent: Feb. 16, 2021

(54) SKEWED ADIABATIC TRANSITION

(71) Applicant: INTERNATIONAL BUSINESS MACHINES CORPORATION, Armonk, NY (US)

(72) Inventor: Tymon Barwicz, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/420,367

(22) Filed: May 23, 2019

(65) Prior Publication Data

US 2020/0371288 A1    Nov. 26, 2020

(51) Int. Cl.
*G02B 6/12* (2006.01)
*G02B 6/122* (2006.01)
*G02B 6/38* (2006.01)

(52) U.S. Cl.
CPC .......... *G02B 6/1223* (2013.01); *G02B 6/1228* (2013.01); *G02B 6/3885* (2013.01); *G02B 2006/12061* (2013.01); *G02B 2006/12147* (2013.01)

(58) Field of Classification Search
CPC ................................ G02B 6/12; G02B 6/1223
USPC ......................................................... 385/129
See application file for complete search history.

(56) References Cited

U.S. PATENT DOCUMENTS

| | | | |
|---|---|---|---|
| 6,310,995 B1 * | 10/2001 | Saini | B82Y 20/00 385/28 |
| 8,320,721 B2 | 11/2012 | Cevini et al. | |
| 8,534,927 B1 | 9/2013 | Barwicz et al. | |
| 8,545,108 B1 | 10/2013 | Barwicz et al. | |
| 8,724,937 B2 | 5/2014 | Barwicz et al. | |
| 8,787,712 B2 * | 7/2014 | Grondin | B82Y 20/00 385/30 |
| 9,020,317 B2 | 4/2015 | Heideman et al. | |

(Continued)

FOREIGN PATENT DOCUMENTS

WO    2018/185576    10/2018

OTHER PUBLICATIONS

Rowland, et al., "Tapered Mismatched Couplers", Journal of Lightwave Technology, vol. 9, No. 5, May 1991, pp. 567-570.

(Continued)

*Primary Examiner* — Kaveh C Kianni
(74) *Attorney, Agent, or Firm* — F. Chau & Associates, LLC

(57) ABSTRACT

Systems and methods for coupling optical fiber to a photonic chip are described. The apparatus may include a low index contrast waveguide overlapping a region of a photonic chip, a high index contrast waveguide at least partially embedded within the overlapped region of the photonic chip, where the high index contrast waveguide comprises a tapered region and a fixed-width routing region, and where the tapered region comprises an adiabatic crossing region and a wide waveguide region connecting the adiabatic crossing region and the fixed-width routing region. A rate of increase of the width of the high index contrast waveguide with respect to position along the length of the high index contrast waveguide is substantially non-linear within the adiabatic crossing region and substantially asymmetric about a minimum slope point.

18 Claims, 12 Drawing Sheets

(56) References Cited

U.S. PATENT DOCUMENTS

| | | | |
|---|---|---|---|
| 9,829,631 B2* | 11/2017 | Lambert | H05K 999/99 |
| 10,261,251 B2 | 4/2019 | Mahgerefteh et al. | |
| 10,393,966 B2* | 8/2019 | Okada | G02B 6/1221 |
| 10,429,589 B2* | 10/2019 | Bookbinder | C03B 32/00 |
| 2003/0044118 A1* | 3/2003 | Zhou | G02B 6/1228 385/43 |
| 2003/0081902 A1* | 5/2003 | Blauvelt | G02B 6/125 385/50 |
| 2004/0076394 A1* | 4/2004 | Carniel | G02B 6/125 385/129 |
| 2004/0202429 A1* | 10/2004 | Margalit | B82Y 20/00 385/49 |
| 2005/0123244 A1* | 6/2005 | Block | G02B 6/1221 385/43 |
| 2007/0223552 A1* | 9/2007 | Muendel | H01S 5/141 372/50.12 |
| 2008/0044126 A1* | 2/2008 | Costa | G02B 6/1228 385/14 |
| 2009/0136190 A1 | 5/2009 | Berini et al. | |
| 2014/0140655 A1* | 5/2014 | Chakravarty | B82Y 20/00 385/12 |
| 2015/0153512 A1* | 6/2015 | Grote | G02B 6/1221 385/42 |
| 2016/0131837 A1* | 5/2016 | Mahgerefteh | G02B 6/1223 385/14 |
| 2016/0266322 A1* | 9/2016 | Epitaux | G02B 6/138 |
| 2016/0299294 A1* | 10/2016 | Wang | G02B 6/1221 |
| 2016/0306117 A1* | 10/2016 | Middlebrook | G02B 6/1221 |
| 2016/0327742 A1* | 11/2016 | Collins | G02B 6/1228 |
| 2016/0327748 A1* | 11/2016 | Stern | H04J 14/04 |
| 2018/0164501 A1 | 6/2018 | Norberg et al. | |
| 2018/0246279 A1* | 8/2018 | Florian Lohse | G02B 6/4227 |
| 2018/0246286 A1* | 8/2018 | Lohse | G02B 6/305 |
| 2018/0275342 A1* | 9/2018 | Shaw | G02B 6/2821 |
| 2018/0299622 A1* | 10/2018 | Menard | G02B 6/00 |
| 2018/0321445 A1 | 11/2018 | Piazza et al. | |
| 2019/0086614 A1* | 3/2019 | Wang | G02B 6/305 |
| 2019/0170945 A1* | 6/2019 | Fortusini | G02B 6/13 |
| 2019/0384005 A1* | 12/2019 | Brusberg | G02B 6/26 |
| 2020/0026005 A1* | 1/2020 | Lipson | G02B 6/305 |
| 2020/0132931 A1* | 4/2020 | Fard | G02B 6/1223 |

OTHER PUBLICATIONS

Syahriar, et al., "The Design of Mode Evolution Couplers", Journal of Lightwave Technology, vol. 16, No. 10, Oct. 1998, pp. 1907-1913.

Ramadan, et al., "Adiabatic Couplers: Design Rules and Optimization", Journal of Lightwave Technology, vol. 16, No. 2, Feb. 1998, pp. 277-283.

Vernooy, et al., "Alignment-Insensitive Coupling for PLC-Based Surface Mount Photonics," IEEE Photonics Technology Letters, vol. 16, No. 1, Jan. 2004, pp. 269-271.

Shu, et al., "Efficient coupler between chip-level and board-level optical waveguides," Optics Letters, vol. 36, No. 18, Sep. 15, 2011, pp. 3614-3616.

Soganci, et al., "Flip-chip optical couplers with scalable I/O count for silicon photonics," Optics Express, vol. 21, No. 13, Jul. 1, 2013, (11 pages).

Barwicz, et al., "Low-cost interfacing of fibers to nanophotonic waveguides: design for fabrication and assembly tolerances," IEEE Photonics Journal, vol. 6, No. 4, 6600818, 2014, (19 pages).

Barwicz, et al., "Optical Demonstration of a Compliant Polymer Interface betwwen Standard Fibers and Nanophotonic Waveguides," Optical Fiber Communication, OSA Technical Digest (online) (Optical Society of America, 2015), paper Th3F.5, (3 pages).

Barwicz,et al., "A compliant polymer interface with 1.4dB loss between standard fibers and nanophotonic waveguides," 2016 Frontiers in Optics, OSA Technical Digest (online) (Optical Society of America, 2016), paper FTu1D.2, (2 pages).

Fu, et al., "Efficient Adiabatic Silicon-On-Insulator Waveguide Taper", Photon. Res., vol. 2, No. 3, Jun. 2014, pp. A41-A44.

Office Action dated Feb. 28, 2020 in co-pending U.S. Appl. No. 16/420,344.

Notice of Allowance dated Jul. 2, 2020 in co-pending U.S. Appl. No. 16/420,344.

* cited by examiner

SKEWED ADIABATIC TRANSITION

BACKGROUND

The following relates generally to integrated photonic devices, and more specifically to coupling a high refractive index contrast waveguide on a photonic chip to an off-chip low refractive index contrast waveguide.

Communications and information processing devices are increasingly reliant on optical transmission to enable faster communication speeds. Silicon photonic devices have been proposed to convert between optical and electronic signals, thereby enabling efficient integration of optical fibers and electronic chips. Thus, photonic chips may serve as an interface between optical transmission systems and electronic information processing systems. Furthermore, photonic chips can be manufactured using processes similar to those for manufacturing electronic semiconductor chips, which makes it possible to produce them efficiently at scale.

However, before being converted to electronic signals, optical signals must first be transferred from an optical fiber into the photonic chip itself. Transmitting energy from a transmission fiber into a photonic chip may result in energy loss which may reduce the performance of the photonic chip. Therefore, there is a need in the art for improved systems and methods for transferring signals between optical fibers and photonic chips.

SUMMARY

An apparatus for coupling optical fiber to a photonic chip is described. The apparatus may include a low index contrast waveguide overlapping a region of the photonic chip, a high index contrast waveguide at least partially embedded within the overlapped region of the photonic chip, wherein the high index contrast waveguide comprises a tapered region and a fixed-width routing region, and wherein the tapered region comprises an adiabatic crossing region and a wide waveguide region connecting the adiabatic crossing region and the fixed-width routing region, and a rate of increase of a width of the high index contrast waveguide with respect to position along a length of the high index contrast waveguide is substantially non-linear within the adiabatic crossing region and substantially asymmetric about a minimum slope point where the rate of increase of the width is at a minimum for the tapered region.

A method of manufacturing an apparatus for coupling to a high refractive index contrast waveguide on a photonic chip to an off-chip low refractive index contrast waveguide is described. The method may include providing a low index contrast waveguide overlapping a region of the photonic chip, providing a high index contrast waveguide at least partially embedded within the overlapped region of the photonic chip, wherein the high index contrast waveguide comprises a tapered region and a fixed-width routing region, and wherein the tapered region comprises an adiabatic crossing region and a wide waveguide region connecting the adiabatic crossing region and the fixed-width routing region, and providing a rate of increase of a width of the high index contrast waveguide with respect to position along a length of the high index contrast waveguide is substantially non-linear within the adiabatic crossing region and substantially asymmetric about a minimum slope point where the rate of increase of the width is at a minimum for the tapered region.

A method of using an apparatus for coupling to a high refractive index contrast waveguide on a photonic chip to an off-chip low refractive index contrast waveguide is described. The method may include using a low index contrast waveguide overlapping a region of the photonic chip, using a high index contrast waveguide at least partially embedded within the overlapped region of the photonic chip, wherein the high index contrast waveguide comprises a tapered region and a fixed-width routing region, and wherein the tapered region comprises an adiabatic crossing region and a wide waveguide region connecting the adiabatic crossing region and the fixed-width routing region, and using a rate of increase of a width of the high index contrast waveguide with respect to position along a length of the high index contrast waveguide is substantially non-linear within the adiabatic crossing region and substantially asymmetric about a minimum slope point where the rate of increase of the width is at a minimum for the tapered region.

In some examples of the apparatus, method of manufacturing, and method of using described above, the adiabatic crossing region is a continuous region comprising each point of the tapered region such that the rate of increase of the width is within four times a minimum rate of increase of the width with respect to position along the length.

In some examples of the apparatus, method of manufacturing, and method of using described above, the tapered region of the high index contrast waveguide is configured to evolve an optical mode from the low index contrast waveguide to the high index contrast waveguide such that there is a substantial power overlap of the optical mode over both the low index contrast waveguide and the high index contrast waveguide at least one point of the adiabatic crossing region and an insubstantial power overlap of the optical mode over both waveguides simultaneously outside the adiabatic crossing region.

In some examples of the apparatus, method of manufacturing, and method of using described above, the adiabatic crossing region has a profile based at least in part on a crossing position uncertainty for the optical mode as related to a fabrication and a relative position tolerance of the high index contrast waveguide and the low index contrast waveguide. In some examples of the apparatus, method of manufacturing, and method of using described above, the fabrication tolerance on the dimensions of the high index contrast waveguide on the photonic chip is at least 10 nm.

In some examples of the apparatus, method of manufacturing, and method of using described above, an average of the rate of increase of the width within the adiabatic crossing region is less than 25% of an average of a rate of increase of the width with respect to position along the length in the wide waveguide region.

In some examples of the apparatus, method of manufacturing, and method of using described above, the adiabatic crossing region comprises a narrow-width half and a wide-width half, wherein the wide-width half is between the narrow-width half and the wide waveguide region, and wherein the rate increase of the width at each point in the wide-width half is more than 20% greater than the rate increase of the width at the minimum slope point. In some examples of the apparatus, method of manufacturing, and method of using described above, the minimum slope point is located within the narrow-width half of the adiabatic crossing region.

In some examples of the apparatus, method of manufacturing, and method of using described above, the tapered region of the high index contrast waveguide further comprises a narrow waveguide region adjacent to the adiabatic crossing region, wherein the narrow waveguide region comprises an end of the high index contrast waveguide. In some examples of the apparatus, method of manufacturing, and method of using described above, the low index contrast waveguide comprises a polymer core and a polymer cladding.

Some examples of the apparatus, method of manufacturing, and method of using described above may further include an adhesive layer connecting the low index contrast waveguide and the photonic chip.

In some examples of the apparatus, method of manufacturing, and method of using described above, at the edge of the photonic chip a refractive index of the high index contrast waveguide core is between 3.2 and 4, a refractive index of the high index contrast waveguide cladding is between 1.35 and 1.5, a refractive index of the polymer cladding is between the refractive index of the high index contrast waveguide cladding and 1.57, a refractive index of the polymer core is between 1.003 and 1.02 times the refractive index of the polymer cladding, a refractive index of the adhesive layer is between 1.45 and the refractive index of the polymer cladding, a height of the high index contrast waveguide core is between 0.12 µm and 0.17 µm, a height of the polymer core is between 1.5 µm and 8 µm, a width of the polymer core is between 5 µm and 15 µm, a thickness of the photonic chip between the high index contrast waveguide and the adhesive layer is less than 1 µm, and a thickness of the adhesive layer between the photonic chip and the low index contrast waveguide is less than 4 µm.

In some examples of the apparatus, method of manufacturing, and method of using described above, a lowest rate of increase of the width within the adiabatic crossing region is between 1.27E-05 and 5.09E-05 µm per normalized unit of distance, and a highest rate of increase of the width within the adiabatic crossing region is between 8.00E-05 and 3.20E-04 µm per normalized unit of distance, wherein the normalized unit of distance is a distance from a tapered end of the high index contrast waveguide to a constant width region of the high index contrast waveguide.

In some examples of the apparatus, method of manufacturing, and method of using described above, at the edge of the photonic chip a refractive index of the high index contrast waveguide core is between 3.2 and 4, a refractive index of the high index contrast waveguide cladding is between 1.35 and 1.5, a refractive index of the polymer cladding is between the refractive index of the high index contrast waveguide cladding and 1.57, a refractive index of the polymer core is between 1.003 and 1.02 times the refractive index of the polymer cladding, a refractive index of the adhesive layer is between 1.45 and the refractive index of the polymer cladding, a height of the high index contrast waveguide core is between 0.165 µm and 0.24 µm, a height of the polymer core is between 1.5 µm and 8 µm, a width of the polymer core is between 5 µm and 15 µm, a thickness of the photonic chip between the high index contrast waveguide and the adhesive layer is less than 1 µM, and a thickness of the adhesive layer between the photonic chip and the low index contrast waveguide is less than 4 µm.

In some examples of the apparatus, method of manufacturing, and method of using described above, a lowest rate of increase of the width within the adiabatic crossing region is between 1.18E-05 and 4.73E-05 µm per normalized unit of distance, and a highest rate of increase of the width within the adiabatic crossing region is between 7.03E-05 and 2.81E-04 µm per normalized unit of distance, wherein the normalized unit of distance is a distance from a tapered end of the high index contrast waveguide to a constant width region of the high index contrast waveguide.

Some examples of the apparatus, method of manufacturing, and method of using described above may further include a silicon nitride layer within the photonic chip between the low index contrast waveguide and the high index contrast waveguide, wherein a refractive index of the silicon nitride layer is between 1.65 and 2.6 and a thickness of the silicon nitride layer is less than 0.2 µm.

In some examples of the apparatus, method of manufacturing, and method of using described above, at the edge of the photonic chip a refractive index of the high index contrast waveguide core is between 1.8 and 2.4, a refractive index of the high index contrast waveguide cladding is between 1.35 and 1.5, a refractive index of the polymer cladding is between the refractive index of the high index contrast waveguide cladding and 1.57, a refractive index of the polymer core is between 1.003 and 1.02 times the refractive index of the polymer cladding, a refractive index of the adhesive layer is between 1.45 and the refractive index of the polymer cladding, a height of the high index contrast waveguide core is between 0.26 µm and 0.375 µm, a height of the polymer core is between 1.5 µm and 8 µm, a width of the polymer core is between 5 µm and 15 µm, a thickness of the photonic chip between the high index contrast waveguide and the adhesive layer is less than 1 µm, and a thickness of the adhesive layer between the photonic chip and the low index contrast waveguide is less than 4 µm.

In some examples of the apparatus, method of manufacturing, and method of using described above, a lowest rate of increase of the width within the adiabatic crossing region is between 2.52E-05 and 1.01E-04 µm per normalized unit of distance, and a highest rate of increase of the width within the adiabatic crossing region is between 1.60E-04 and 6.41E-04 µm per normalized unit of distance, wherein the normalized unit of distance is a distance from a tapered end of the high index contrast waveguide to a constant width region of the high index contrast waveguide.

In some examples of the apparatus, method of manufacturing, and method of using described above, at the edge of the photonic chip a refractive index of the high index contrast waveguide core is between 1.8 and 2.4, a refractive index of the high index contrast waveguide cladding is between 1.35 and 1.5, a refractive index of the polymer cladding is between the refractive index of the high index contrast waveguide cladding and 1.57, a refractive index of the polymer core is between 1.003 and 1.02 times the refractive index of the polymer cladding, a refractive index of the adhesive layer is between 1.45 and the refractive index of the polymer cladding, a height of the high index contrast waveguide core is between 0.375 µm and 0.5 µm, a height of the polymer core is between 1.5 µm and 8 µm, a width of the polymer core is between 5 µm and 15 µm, a thickness of the photonic chip between the high index contrast waveguide core and the adhesive layer is less than 1 µm, and a thickness of the adhesive layer between the photonic chip and the low index contrast waveguide is less than 4 µm.

In some examples of the apparatus, method of manufacturing, and method of using described above, a lowest rate of increase of the width within the adiabatic crossing region is between 3.63E-05 and 1.45E-05 µm per normalized unit of distance, and a highest rate of increase of the width within the adiabatic crossing region is between 4.46E-04 and 1.79E-03 µm per normalized unit of distance, wherein the normalized unit of distance is based a distance from a tapered end of the high index contrast waveguide to a constant width region of the high index contrast waveguide.

In some examples of the apparatus, method of manufacturing, and method of using described above, the apparatus is configured to transmit infrared light between the optical fiber and the photonic chip. In some examples of the apparatus, method of manufacturing, and method of using described above, the apparatus is configured for single mode transmission.

In some examples of the apparatus, method of manufacturing, and method of using described above, the low index contrast waveguide overlaps the high index contrast waveguide for a distance of between 50 µm and 5 mm in a direction perpendicular to the edge of the photonic chip. In some examples of the apparatus, method of manufacturing, and method of using described above, a distance between the low index contrast waveguide and the high index contrast waveguide is less than 5 µm at least one point along the high index contrast waveguide. In some examples of the apparatus, method of manufacturing, and method of using described above, the low index contrast waveguide has a refractive index contrast of less than 5%, and the high index contrast waveguide has a refractive index contrast of greater than 5%.

DETAILED DESCRIPTION

Figure 1:
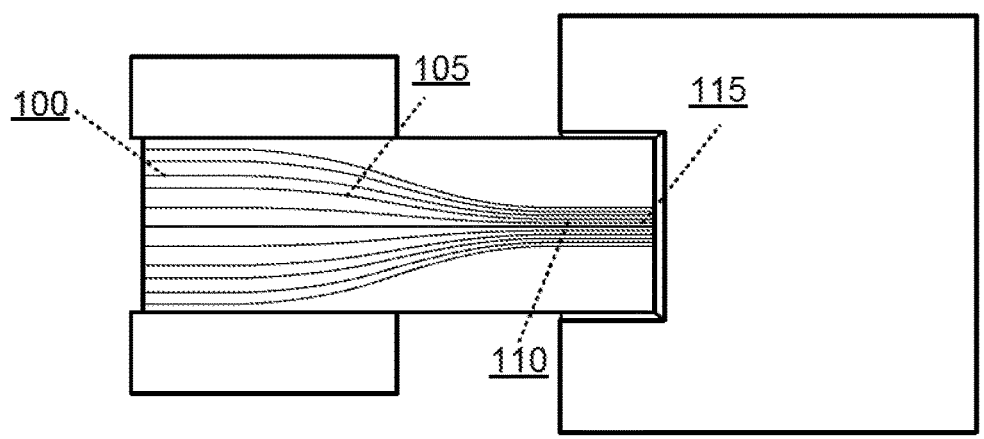
FIGS. 1 and 2 show examples of an apparatus for coupling optical fiber to a photonic chip in accordance with aspects of the present disclosure.
Figure 1:
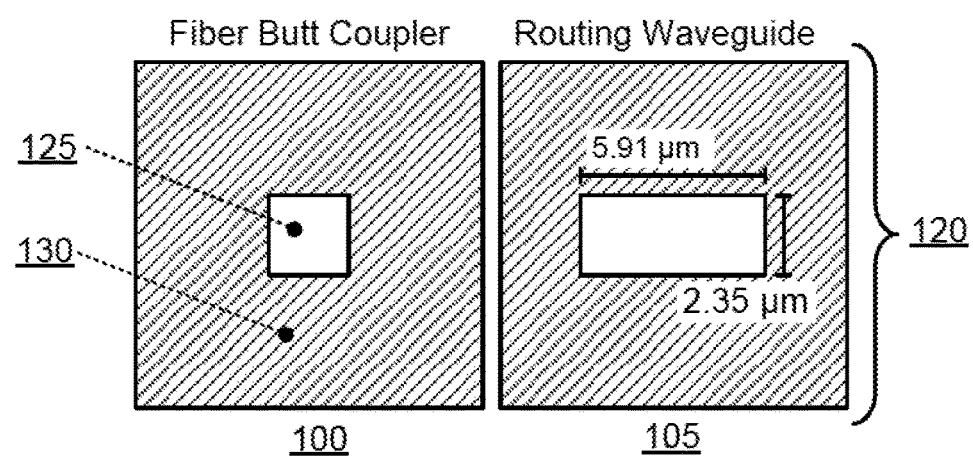
Figure 1:
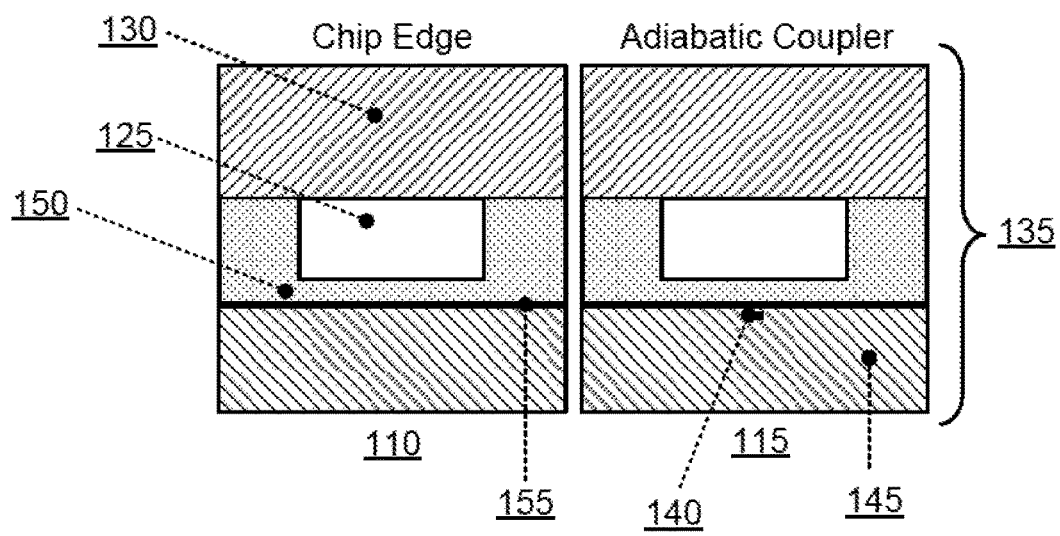

Embodiments of the present disclosure describe an apparatus for coupling an off-chip low refractive index contrast waveguide (e.g., with a refractive index contrast of less than 5%) to an on-chip high refractive index contrast waveguide (e.g., with a refractive index contrast of more than 5%). The systems and methods disclosed may be relevant to, but are not limited to, coupling between on-chip silicon photonic waveguides to off-chip polymer waveguides for fiber interfacing.

Conventional methods for adiabatic coupling of an off-chip waveguide with an on-chip waveguide utilize a tapered high index contrast waveguide tip with an adiabatic crossing region characterized by a slope that is symmetric about an estimated crossing point. However, the crossing of the power from one waveguide to another depends on the effective indices of the individual waveguides. The effective index will depend on the width and height of each waveguide and on the exact refractive indices of the waveguide core and cladding. All these parameters will vary with fabrication and assembly tolerances. It is key to the current invention to realize that the exact width of the high index contrast waveguide at the point of adiabatic power crossing will depend on the other parameters of the waveguides such as height and refractive index. These other parameters will also impact the speed of the power crossing, which goes with the slope of the effective index of the crossing mode. Specifically, the effective index of the guided mode slopes up more sharply when the width at the crossing point is narrower and slopes up more slowly when the width at the crossing point is wider. Thus, according to embodiments of the present disclosure, the acceptable high index contrast tapering slope is different for crossings that are shifted by fabrication tolerances on narrower widths and the ones that are shifted on wider widths of high index contrast waveguides. For wider widths, the width of the high index contrast waveguide can increase at a higher rate as the high index contrast waveguide gets wider within the crossing region.

A waveguide is a structure that facilitates the propagation of waves with minimal loss of energy. Waveguides typically operate by restricting the expansion of the propagating wave to one dimension (i.e., the dimension of travel). Outside of a waveguide, the energy of a wave decreases according to the inverse square law as it expands into three dimensional space. Within a waveguide, the energy of the wave can be transmitted across very long distances with little energy loss. Optical transmission fibers are an example of waveguides used to transmit energy (and therefore, information) over long distances.

Dielectric waveguides (including optical fibers) may be constructed by surrounding a first material (the waveguide) with one or more outer materials having a different refractive index (the cladding). The contrast in the refractive indices causes internal reflection at the surface of the two materials, which creates a standing wave pattern and confines the wave to within the waveguide. The pattern of the standing wave pattern may be referred to as a mode. Optical waveguides may be categorized into single mode waveguides, which have a relatively small cross section and support no more than a single transmission mode of each polarization, and multimode waveguides, which have a relatively large cross section and support multiple transmission modes.

The energy of the wave also penetrates a certain distance beyond the waveguide core and into the cladding in the form of an evanescent (non-propagating) wave. The existence of this evanescent wave enables electromagnetic energy to be transferred from one waveguide to another (i.e., if the energy penetrates into the other waveguide, thus exciting a new transmission mode). An adiabatic (or mode evolution) transition from one waveguide to another may be referred to as an adiabatic (or mode evolution) crossing. Adiabatic transitions may prevent mode coupling, and may effect the transition by transforming the mode propagating in one waveguide into the transmission mode of the other waveguide.

Adiabatic transitions from one waveguide to another may be used to transfer (i.e., evolve) energy from an optical transmission waveguide into a photonic chip. The transition between a transmission waveguide and a waveguide within a photonic chip often involves a low index contrast waveguide for transmission and a smaller, high index contrast waveguide within the photonic chip. Typically, the high index contrast waveguide begins at a certain distance within the photonic chip (e.g., at least 5-10 µm from the edge) and has a tapered shape to reduce energy loss during transition. However, in some embodiments the high index contrast waveguide begins at the chip edge.

The present disclosure describes an apparatus for coupling optical fiber to a photonic chip that provides a more efficient transfer of power from a low index contrast waveguide and a high index contrast waveguide. According to various embodiments, the high index contrast waveguide comprises a tapered region and a fixed-width routing region, and where the tapered region includes an adiabatic crossing region and a wide waveguide region connecting the adiabatic crossing region and the fixed-width routing region. The rate of increase of the width of the high index contrast waveguide (specifically, the high index contrast waveguide core) with respect to is substantially non-linear within the adiabatic crossing region and substantially asymmetric about an estimate adiabatic crossing point within the crossing region.

The asymmetry of the adiabatic crossing region can help mitigate inefficiencies associated with uncertainty regarding the precise crossing point, as well as fabrication tolerances. As a result, the systems and methods described herein may result in more efficient transfer of an optical signal from a low index contrast waveguide to a high index contrast waveguide as compared to conventional systems and methods.

FIG. 1 shows an example of an apparatus for coupling optical fiber to a photonic chip in accordance with aspects of the present disclosure. The example shown includes first cross section 100, second cross section 105, third cross section 110, and fourth cross section 115. In some examples, the apparatus is configured to convey single mode, infrared light between the optical fiber and the photonic chip. However, this is not limiting of the inventive concept, and the coupling apparatus shown in FIG. 1 may also be used to transmit other electromagnetic signals.

Each cross section may include one or more of a low index contrast waveguide 120 (e.g., a polymer waveguide), a high index contrast waveguide 135 (e.g., a silicon waveguide), adhesive layer 150, and, in some cases, a silicon nitride layer 155 (e.g., $Si_3N_4$ or SiN). The first cross section 100 shows the configuration of the apparatus near a coupling to a set of optical fibers (i.e., a fiber butt coupler). Second cross section 105 shows a routing waveguide during a transition from the fiber butt coupler to the edge of the photonic chip.

Third cross section 110 shows the configuration of the coupling apparatus at the chip edge. Conventionally, a high index contrast waveguide core within the photonic chip does not extend to the chip edge (as shown in this example, and in FIG. 3). For example, the high index contrast waveguide may be offset from the edge by a distance of more than 5 or 10 µm. In some cases, the high index contrast waveguide core extends to the chip edge, but begins with a very narrow cross section and becomes wider according to a taper structure as described herein.

Fourth cross section 115 depicts an adiabatic coupling portion of the apparatus within the region where the low index contrast waveguide overlaps the photonic chip (i.e., in a plan view depicting a plane parallel to the upper surface of the photonic chip). According to the present disclosure, and adiabatic crossing region of the high index contrast waveguide core within the coupling portion may have a skewed or asymmetric shape.

Low index contrast waveguide 120 may overlap a region of the photonic chip including high index contrast waveguide 135. In one embodiment, the low index contrast waveguide 120 overlaps the high index contrast waveguide 135 for a distance of between 50 µm and 5 mm in a direction perpendicular to the edge of the photonic chip. In some examples, the low index contrast waveguide 120 includes a polymer core 125 and a polymer cladding 130. Low index contrast waveguide 120 may be an example of, or include aspects of, the corresponding element or elements described with reference to FIG. 2. Polymer core 125 and polymer cladding 130 may be examples of, or include aspects of, the corresponding elements described with reference to FIGS. 2, and 4-7.

High index contrast waveguide 135 may be at least partially embedded within the overlapped region of the photonic chip. In example embodiments, the high index contrast waveguide 135 (specifically, the high index contrast waveguide core 140) comprises a tapered region and a fixed-width routing region, wherein the tapered region comprises an adiabatic crossing region and a wide waveguide region connecting the adiabatic crossing region and the fixed-width routing region. In some examples, a rate of increase of a width of the high index contrast waveguide core 140 with respect to position along a length of the high index contrast waveguide 135 is substantially non-linear within the adiabatic crossing region and substantially asymmetric about a minimum slope point where the rate of increase of the width is at a minimum for the tapered region.

High index contrast waveguide 135 may include high index contrast waveguide core 140 and high index contrast waveguide cladding 145. High index contrast waveguide core 140 and high index contrast waveguide cladding 145 may be examples of, or include aspects of, the corresponding elements described with reference to FIGS. 2, and 4-7.

Adhesive layer 150 may connect the low index contrast waveguide core 125 and the photonic chip. Adhesive layer 150 may be an example of, or include aspects of, the corresponding element or elements described with reference to FIGS. 4-7. Silicon nitride layer 155 may be an example of, or include aspects of, the corresponding element or elements described with reference to FIGS. 6 and 7.

Four examples are given below of various configurations of an apparatus for coupling optical fiber to a photonic chip in accordance with aspects of the present disclosure. These examples include specific ranges for the size, shape and refractive index of individual components, but these ranges are examples and are not limiting of the present disclosure.

In a first example, at the edge of the photonic chip a refractive index of the high index contrast waveguide core 140 is between 3.2 and 4, a refractive index of the high index contrast waveguide cladding 145 is between 1.35 and 1.5, a refractive index of the polymer cladding 130 is between the refractive index of the high index contrast waveguide cladding 145 and 1.57, a refractive index of the polymer core 125 is between 1.003 and 1.02 times the refractive index of the polymer cladding 130, a refractive index of the adhesive layer 150 is between 1.45 and the refractive index of the polymer cladding 130, a height of the high index contrast waveguide core 140 is between 0.12 μm and 0.17 μm, a height of the polymer core 125 is between 1.5 μm and 8 μm, a width of the polymer core 125 is between 5 m and 15 m, a thickness of the photonic chip between the high index contrast waveguide 135 and the adhesive layer 150 is less than 1 μm, and a thickness of the adhesive layer 150 between the photonic chip and the low index contrast waveguide 120 is less than 4 μm.

In the first example, a lowest rate of increase of the width within the adiabatic crossing region is between 1.27E-05 and 5.09E-05 μm per normalized unit of distance, and a highest rate of increase of the width within the adiabatic crossing region is between 8.00E-05 and 3.20E-04 μm per normalized unit of distance, where the normalized unit of distance is a distance from a tapered end of the high index contrast waveguide 135 to a constant width region of the high index contrast waveguide 135.

In a second example, at the edge of the photonic chip a refractive index of the high index contrast waveguide core 140 is between 3.2 and 4, a refractive index of the high index contrast waveguide cladding 145 is between 1.35 and 1.5, a refractive index of the polymer cladding 130 is between the refractive index of the high index contrast waveguide cladding 145 and 1.57, a refractive index of the polymer core 125 is between 1.003 and 1.02 times the refractive index of the polymer cladding 130, a refractive index of the adhesive layer 150 is between 1.45 and the refractive index of the polymer cladding 130, a height of the high index contrast waveguide core 140 is between 0.165 μm and 0.24 μm, a height of the polymer core 125 is between 1.5 μm and 8 μm, a width of the polymer core 125 is between 5 μm and 15 μm, a thickness of the photonic chip between the high index contrast waveguide 135 and the adhesive layer 150 is less than 1 μm, and a thickness of the adhesive layer 150 between the photonic chip and the low index contrast waveguide 120 is less than 4 μm.

In the second example, a lowest rate of increase of the width within the adiabatic crossing region is between 1.18E-05 and 4.73E-05 μm per normalized unit of distance, and a highest rate of increase of the width within the adiabatic crossing region is between 7.03E-05 and 2.81E-04 μm per normalized unit of distance, where the normalized unit of distance is a distance from a tapered end of the high index contrast waveguide 135 to a constant width region of the high index contrast waveguide 135.

In a third example, a refractive index of the silicon nitride layer 155 is between 1.65 and 2.6 and a thickness of the silicon nitride layer 155 is less than 0.2 μm. In the third example, at the edge of the photonic chip a refractive index of the high index contrast waveguide core 140 is between 1.8 and 2.4, a refractive index of the high index contrast waveguide cladding 145 is between 1.35 and 1.5, a refractive index of the polymer cladding 130 is between the refractive index of the high index contrast waveguide cladding 145 and 1.57, a refractive index of the polymer core 125 is between 1.003 and 1.02 times the refractive index of the polymer cladding 130, a refractive index of the adhesive layer 150 is between 1.45 and the refractive index of the polymer cladding 130, a height of the high index contrast waveguide core 140 is between 0.26 μm and 0.375 μm, a height of the polymer core 125 is between 1.5 μm and 8 μm, a width of the polymer core 125 is between 5 μm and 15 μm, a thickness of the photonic chip between the high index contrast waveguide 135 and the adhesive layer 150 is less than 1 μm, and a thickness of the adhesive layer 150 between the photonic chip and the low index contrast waveguide 120 is less than 4 μm.

In the third example, a lowest rate of increase of the width within the adiabatic crossing region is between 2.52E-05 and 1.01E-04 μm per normalized unit of distance, and a highest rate of increase of the width within the adiabatic crossing region is between 1.60E-04 and 6.41E-04 μm per normalized unit of distance, where the normalized unit of distance is a distance from a tapered end of the high index contrast waveguide 135 to a constant width region of the high index contrast waveguide 135.

In a fourth example, at the edge of the photonic chip a refractive index of the high index contrast waveguide core 140 is between 1.8 and 2.4, a refractive index of the high index contrast waveguide cladding 145 is between 1.35 and 1.5, a refractive index of the polymer cladding 130 is between the refractive index of the high index contrast waveguide cladding 145 and 1.57, a refractive index of the polymer core 125 is between 1.003 and 1.02 times the refractive index of the polymer cladding 130, a refractive index of the adhesive layer 150 is between 1.45 and the refractive index of the polymer cladding 130, a height of the high index contrast waveguide core 140 is between 0.375 μm and 0.5 μm, a height of the polymer core 125 is between 1.5 μm and 8 μm a width of the polymer core 125 is between 5 μm and 15 μm, a thickness of the photonic chip between the high index contrast waveguide core 140 and the adhesive layer 150 is less than 1 μm, and a thickness of the adhesive layer 150 between the photonic chip and the low index contrast waveguide 120 is less than 4 μm.

In the fourth example, a lowest rate of increase of the width within the adiabatic crossing region is between 3.63E-05 and 1.45E-05 m per normalized unit of distance, and a highest rate of increase of the width within the adiabatic crossing region is between 4.46E-04 and 1.79E-03 μm per normalized unit of distance, where the normalized unit of distance is based a distance from a tapered end of the high index contrast waveguide 135 to a constant width region of the high index contrast waveguide 135.

In some examples, a distance between the low index contrast waveguide 120 and the high index contrast waveguide 135 is less than 5 μm at least one point along the high index contrast waveguide 135. In some examples, the low index contrast waveguide 120 has a refractive index contrast of less than 5%, and the high index contrast waveguide 135 has a refractive index contrast of greater than 5%.

Figure 2:
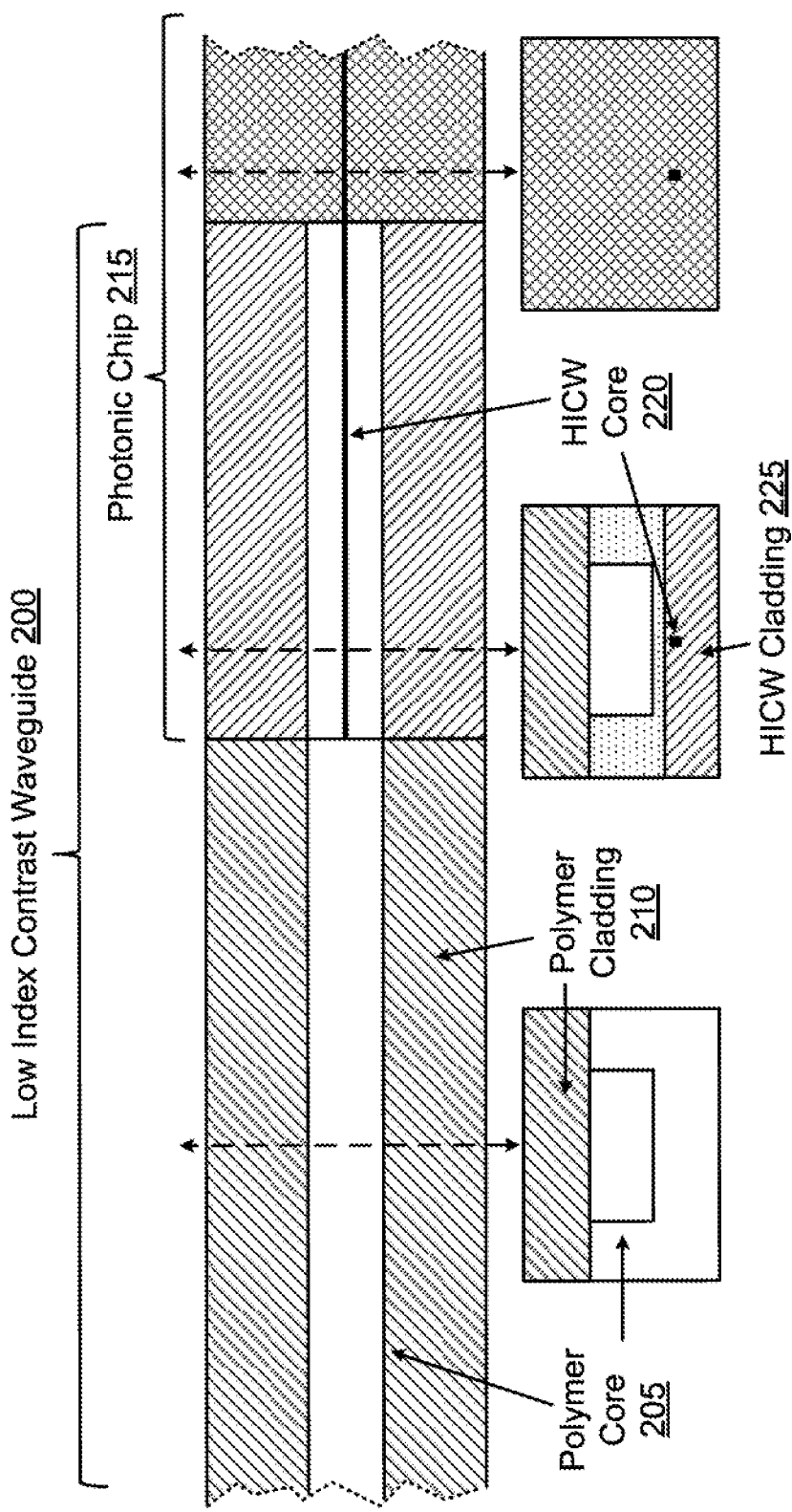

FIG. 2 shows an example of an apparatus for coupling optical fiber to a photonic chip 215 in accordance with aspects of the present disclosure. The example shown includes low index contrast waveguide 200 and photonic chip 215. The low index contrast waveguide 200 may be in the form of a ribbon configured to transmit signals to and from the photonic chip 215.

Low index contrast waveguide 200 may be an example of, or include aspects of, the corresponding element or elements described with reference to FIG. 1. Low index contrast waveguide 200 may include polymer core 205 and polymer cladding 210. Polymer core 205 and polymer cladding 210 may be examples of, or include aspects of, the corresponding elements described with reference to FIGS. 1, and 4-7.

Photonic chip 215 may include a high index contrast waveguide comprising high index contrast waveguide core 220 and high index contrast waveguide cladding 225.

High index contrast waveguide core 220 and high index contrast waveguide cladding 225 may be examples of, or include aspects of, the corresponding elements described with reference to FIGS. 1, and 4-7.

Figure 3:
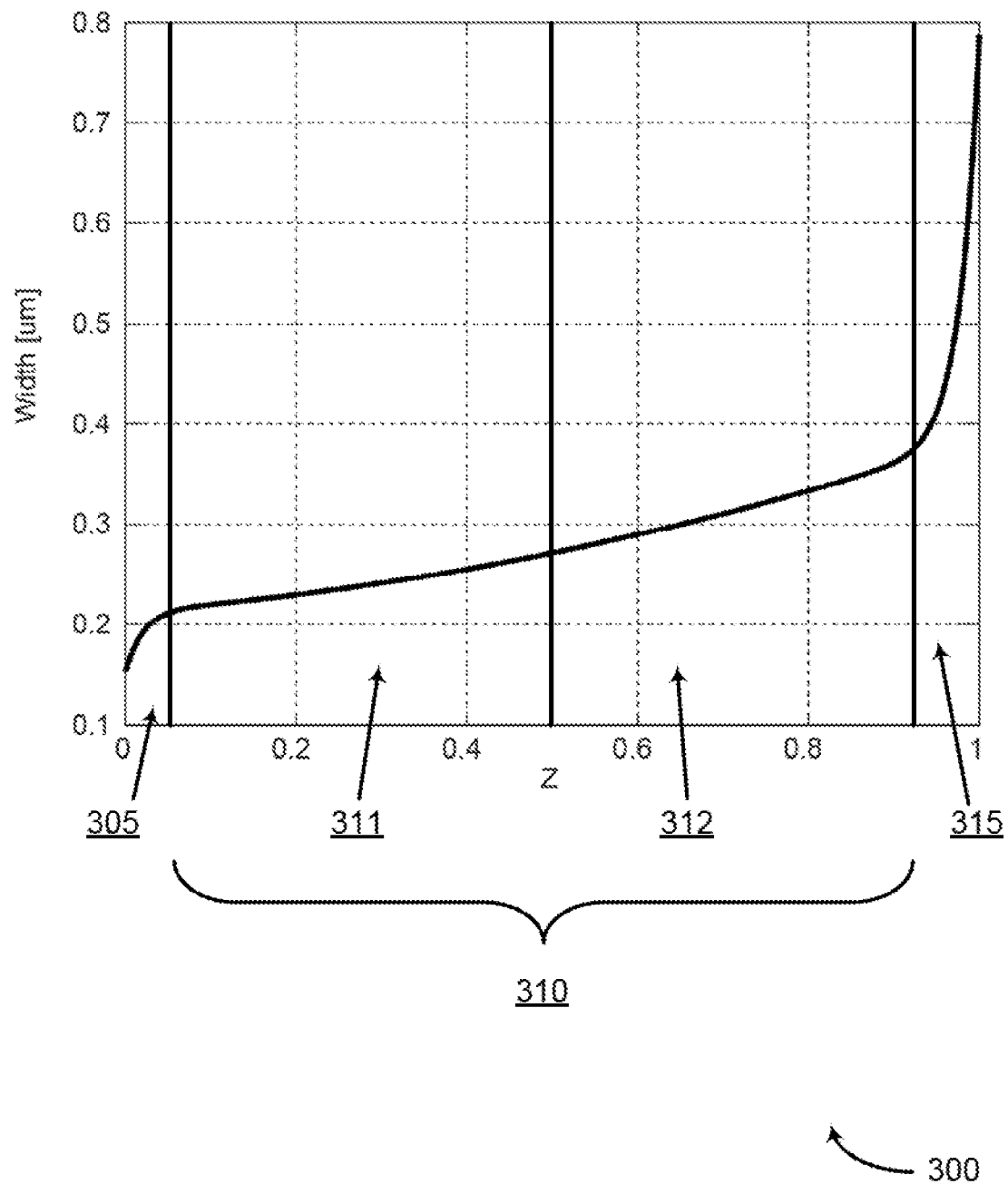
FIG. 3 shows an example of a profile of a high index contrast waveguide core in accordance with aspects of the present disclosure.

FIG. 3 shows an example of a profile of a high index contrast waveguide core 300 in accordance with aspects of the present disclosure. Specifically, FIG. 3 shows and example of how the high index contrast waveguide core 300 may be tapered at the end near the edge of the photonic chip. High index contrast waveguide core 300 may be an example of, or include aspects of, the corresponding element or elements described with reference to FIGS. 1, 2, and 4-7.

The vertical axis of the graph of the profile of the high index contrast waveguide core 300 corresponds to the width of the waveguide tip (in um). The horizontal axis corresponds to the length along the waveguide tip (normalized so that the entire length of the waveguide tip is equal to one). According to embodiments of the present disclosure, high index contrast waveguide core 300 includes a skewed, asymmetric adiabatic crossing region 310. However, in some embodiments, the differences in slope within the adiabatic crossing region 310 are small compared to differences between the slope of the adiabatic crossing region 310 and the narrow waveguide region 305 or wide waveguide region 315.

High index contrast waveguide core 300 may include narrow waveguide region 305, adiabatic crossing region 310, wide waveguide region 315, and fixed-width routing region (not shown, to the right of the wide waveguide region 315). Narrow waveguide region 305 is omitted in some embodiments. Narrow waveguide region 305, adiabatic crossing region 310 and wide waveguide region 315 may be examples of, or include aspects of, the corresponding elements described with reference to FIG. 9.

In general, decreasing the slope (i.e., the rate of change of the width with respect to the length) near the crossing point improves the efficiency of the mode evolution between a low index contrast waveguide (not shown) and the high index contrast waveguide core 300. One reason for the extended length of the adiabatic crossing region 310 is that the exact location of the crossing point may not be known, and the precision of the high index contrast waveguide core 300 may be limited by manufacturing tolerances. However, according to the present disclosure, the optimal slope depends on the width. Thus, if the crossing point is located within a narrow-width half 311, the optimal slope may be less than if the crossing point is within the wide-width half 312. Thus, embodiments of the present disclosure describe an adiabatic crossing region 310 with a skewed, asymmetric slope (i.e., of width vs length).

In embodiments of the present disclosure, the adiabatic crossing region 310 is a continuous region including each point of the tapered region of high index contrast waveguide core 300 such that the rate of increase of the width is within four times a minimum rate of increase of the width with respect to position along the length. In some examples, the adiabatic crossing region 310 has a profile based on a crossing position uncertainty for the optical mode as related to a fabrication and a relative position tolerance of the high index contrast waveguide and the low index contrast waveguide. In some examples, the fabrication tolerance on the dimensions of the high index contrast waveguide on the photonic chip is at least 10 nm.

In some examples, an average of the rate of increase of the width within the adiabatic crossing region 310 is less than 25% of an average of a rate of increase of the width with respect to position along the length in the wide waveguide region 315. In some examples, the adiabatic crossing region 310 includes a narrow-width half 311 and a wide-width half 312 (along the length of the high index contrast waveguide core 300, which is represented vertically in FIG. 3), where the wide-width half 312 is between the narrow-width half 311 and the wide waveguide region 315, and where the rate increase of the width at each point in the wide-width half 312 is more than 20% greater than the rate increase of the width at the minimum slope point. In some examples, the minimum slope point is located within the narrow-width half 311 of the adiabatic crossing region 310.

Next, referring to FIGS. 4-7, four different structures show example configurations of the cross section of a coupling apparatus at the edge of a photonic chip. The different configurations illustrated how the size and refractive index of the high index contrast waveguide may vary based on the configuration of the low index contrast waveguide and the presence of a silicon nitride layer in order to minimize the combined perturbation at the chip edge due to the presence of both the photonic chip and the high index contrast waveguide. The examples provided in FIGS. 4-7 are provided as illustrations only, and are not limiting of the inventive concept of the present disclosure.

Specifically, Table 1 shows example parameters for the coupling apparatus that are common to the variations described in FIGS. 4-7 (i.e., the high index contrast waveguide cladding, the silicon nitride layer (in FIGS. 6 and 7), the adhesive layer, the low index contrast waveguide (i.e., the polymer core) and the low index contrast waveguide cladding (i.e., the polymer cladding). Due to the presence of the silicon nitride layer in FIGS. 6 and 7, the high index contrast waveguide cladding (characterized by the refractive index n2 and height h2) is divided into a region below the silicon nitride layer (characterized by the refractive index n2a, and height h2a) and a region above the silicon nitride layer (characterized by the refractive index n2b and height h2b). Thus, for the cross-sections depicted in FIGS. 4 and 5, we may set the define the limitations on the ranges of n2 and h2 based on n2=n2a, and h2=h2a+h2b.

TABLE 1

Parameters of the Coupling Apparatus

| | Refractive index (n) | Height (h) | Width (w) |
|---|---|---|---|
| HICW Cladding (2a) | 1.35 to 1.50 | 0 to 0.5 um | N/A |
| HICW Cladding (2b) | 1.35 to 1.50 | 0 to 0.5 um | N/A |
| Silicon Nitride (3) | 1.65 to 2.6 | 0 to 0.2 um | N/A |
| Adhesive (4) | 1.45 to n6 | 0 to 4 um | N/A |
| LICW (5) | 1.003*n6 to 1.02*n6 | 1.5 to 8 um | 5 to 15 um |
| LICW Cladding (6) | n2 (or n2a) to 1.57 | N/A | N/A |

While the ranges for the parameters of table 1 remain constant throughout FIGS. 5-8, Table 2 below shows how the configuration of the high index contrast waveguide is adjusted to reduce the combined perturbation.

TABLE 2

Configurations for the High Index Contrast Waveguide

| | Refractive index (n1) | Height (h1) | Width (w1) |
|---|---|---|---|
| HICW Structure 1 | 3.2 to 4.0 | 0.12 to 0.17 um | 0.05 to 0.8 um |
| HICW Structure 2 | 3.2 to 4.0 | 0.165 to 0.24 um | 0.03 to 0.7 um |
| HICW Structure 3 | 1.8 to 2.4 | 0.260 to 0.375 um | 0.1 to 1.5 um |
| HICW Structure 4 | 1.8 to 2.4 | 0.375 to 0.500 um | 0.05 to 1.2 um |

Figure 4:
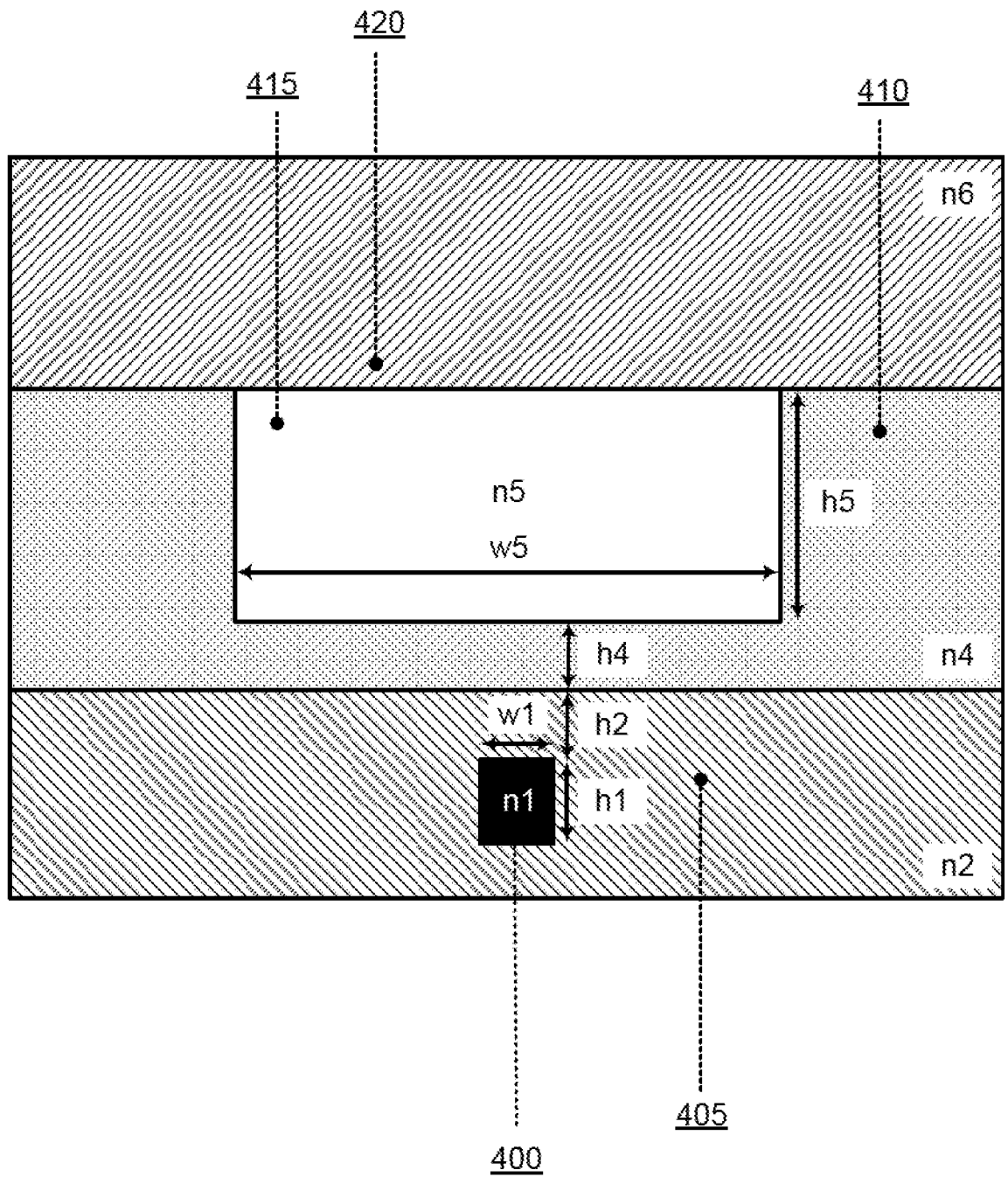
FIG. 4 shows an example of a first cross section of an apparatus for coupling optical fiber to a photonic chip in accordance with aspects of the present disclosure.

FIG. 4 shows an example of a first cross section of an apparatus for coupling optical fiber to a photonic chip in accordance with aspects of the present disclosure. The example of FIG. 4 shows the polymer cladding 420 covering a single surface of the polymer core 415 (i.e., the low index contrast waveguide). The example shown includes high index contrast waveguide core 400, high index contrast waveguide cladding 405, adhesive layer 410, polymer core 415, and polymer cladding 420. Additional layers of the apparatus which have little or no impact on the configuration of the high index contrast waveguide may be located above or below those layers depicted. The high index contrast waveguide 400 may be characterized by the parameters of high index contrast waveguide (HICW) Structures 1-4 of table 2.

Figure 5:
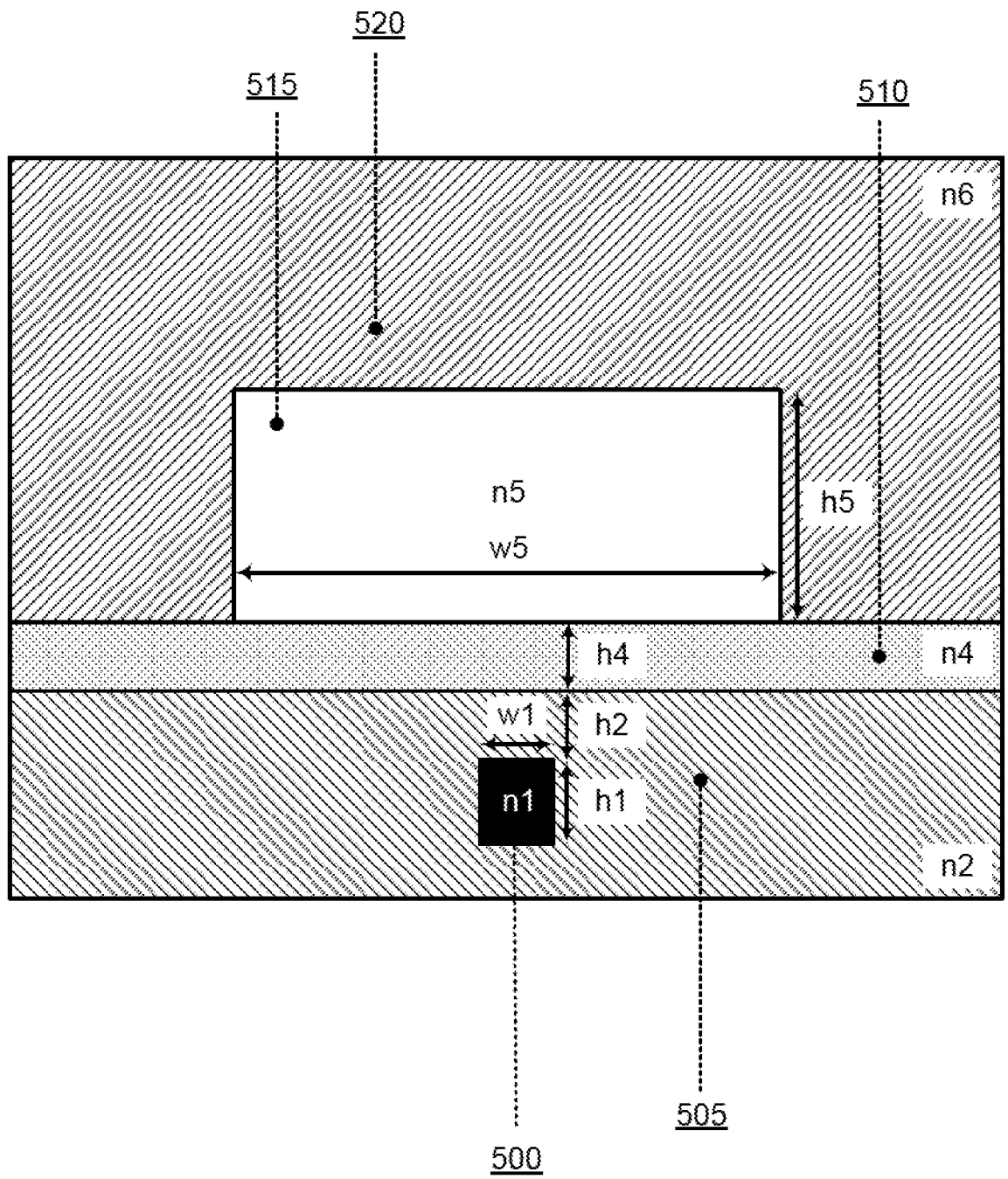
FIG. 5 shows an example of a second cross section of an apparatus for coupling optical fiber to a photonic chip in accordance with aspects of the present disclosure.

FIG. 5 shows an example of a second cross section of an apparatus for coupling optical fiber to a photonic chip in accordance with aspects of the present disclosure. The example of FIG. 5 shows the polymer cladding 520 covering three surfaces of the polymer core 515 (i.e., the low index contrast waveguide). The example shown includes high index contrast waveguide core 500, high index contrast waveguide cladding 505, adhesive layer 510, polymer core 515, and polymer cladding 520. Additional layers of the apparatus which have little or no impact on the configuration of the high index contrast waveguide may be located above or below those layers depicted. The high index contrast waveguide 500 may be characterized by the parameters of HICW Structures 1-4 of table 2.

Figure 6:
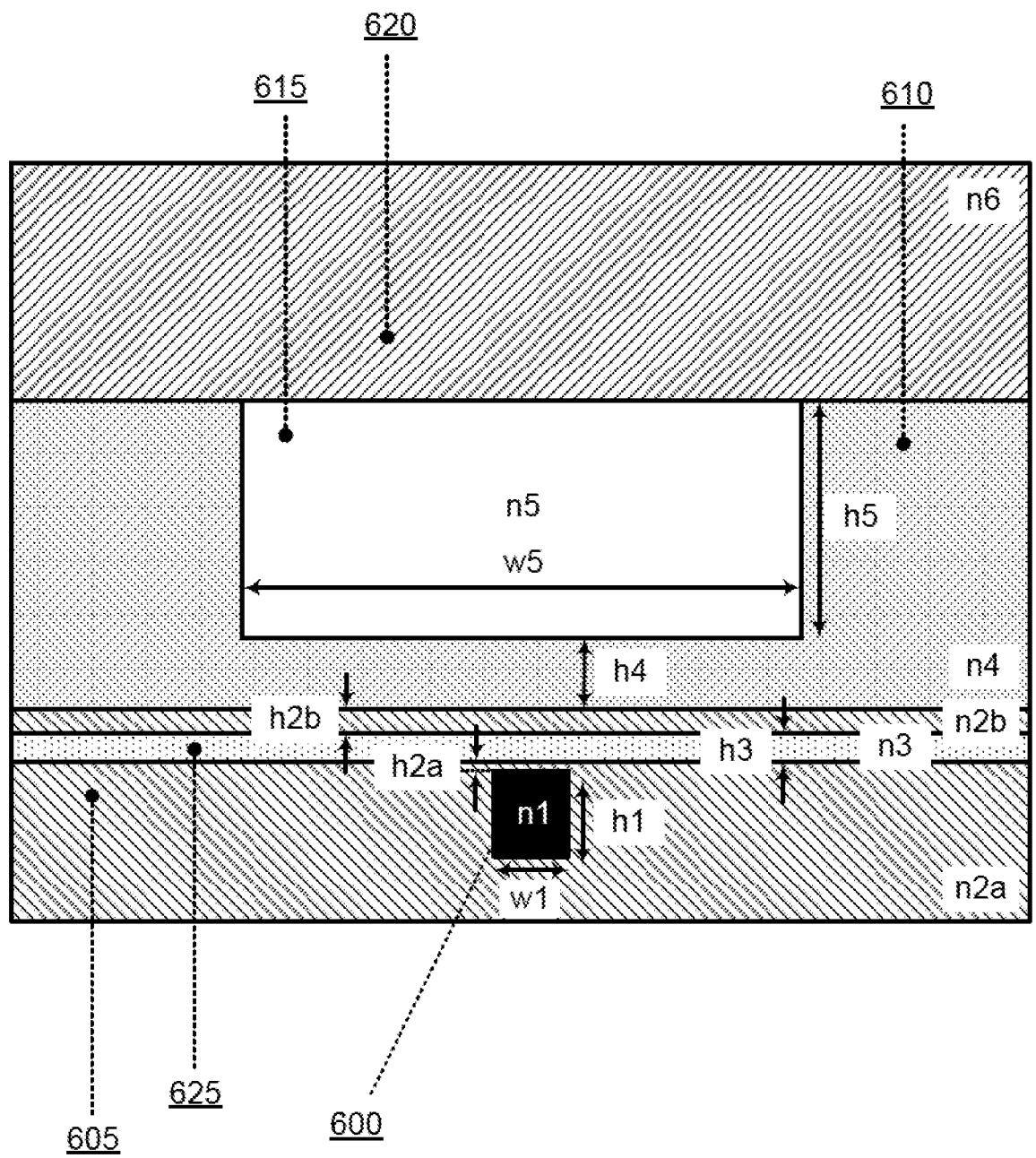
FIG. 6 shows an example of a third cross section of an apparatus for coupling optical fiber to a photonic chip in accordance with aspects of the present disclosure.

FIG. 6 shows an example of a third cross section of an apparatus for coupling optical fiber to a photonic chip in accordance with aspects of the present disclosure. The example of FIG. 6 shows the polymer cladding 620 covering a single surface of the polymer core 615 (i.e., the low index contrast waveguide) as well as a silicon nitride layer 625 within the photonic chip. The example shown includes high index contrast waveguide core 600, high index contrast waveguide cladding 605, adhesive layer 610, polymer core 615, polymer cladding 620, and silicon nitride layer 625. Additional layers of the apparatus which have little or no impact on the configuration of the high index contrast waveguide may be located above or below those layers depicted. The high index contrast waveguide 600 may be characterized by the parameters of HICW Structures 1-4 of table 2.

Figure 7:
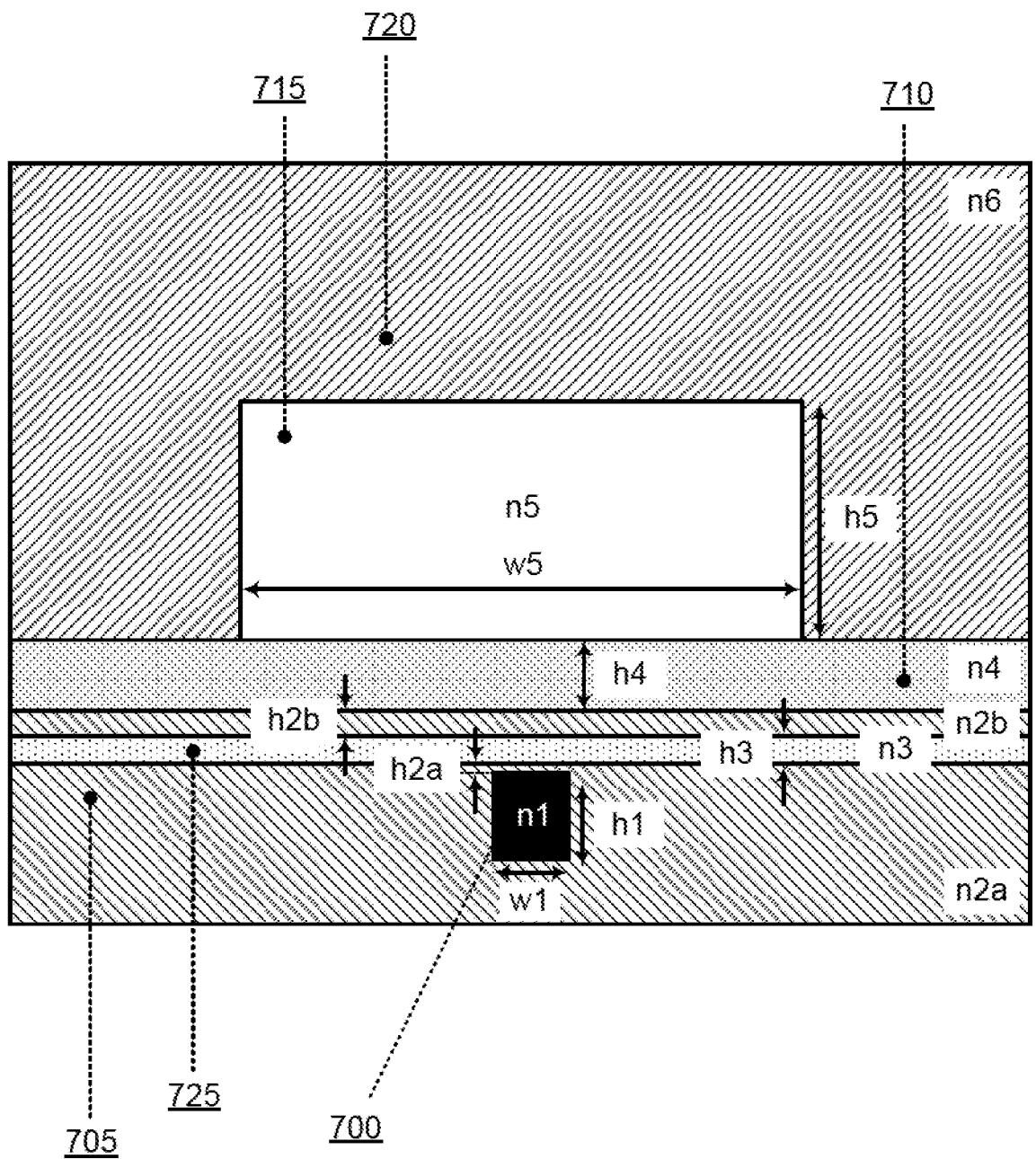
FIG. 7 shows an example of a fourth cross section of an apparatus for coupling optical fiber to a photonic chip in accordance with aspects of the present disclosure.

FIG. 7 shows an example of a fourth cross section of an apparatus for coupling optical fiber to a photonic chip in accordance with aspects of the present disclosure. The example of FIG. 7 shows the polymer cladding 720 covering three surfaces of the polymer core 715 (i.e., the low index contrast waveguide) as well as a silicon nitride layer 725 within the photonic chip. The example shown includes high index contrast waveguide core 700, high index contrast waveguide cladding 705, adhesive layer 710, polymer core 715, polymer cladding 720, and silicon nitride layer 725. Additional layers of the apparatus which have little or no impact on the configuration of the high index contrast waveguide may be located above or below those layers depicted. The high index contrast waveguide 700 may be characterized by the parameters of HICW Structures 1-4 of table 2.

Figure 8:
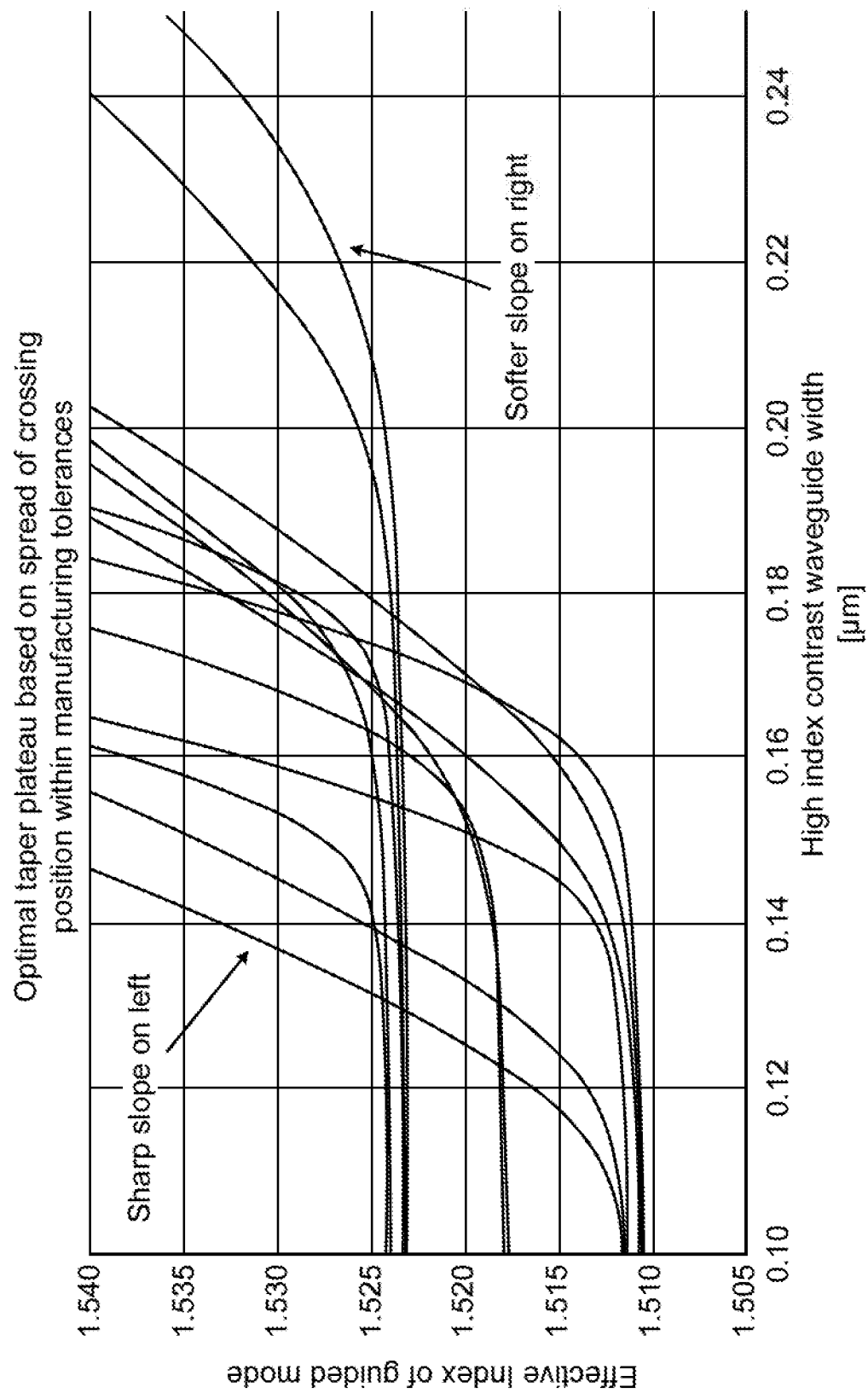
FIG. 8 shows an example of a graph of the optimal taper plateau based on the spread of a crossing position within manufacturing tolerances in accordance with aspects of the present disclosure.

FIG. 8 shows an example of a graph of the optimal taper plateau based on the spread of a crossing position within manufacturing tolerances in accordance with aspects of the present disclosure. FIG. 8 may provide an intuitive understanding of how a skewed profile provides improved performance of an adiabatic crossing region.

Each curve in FIG. 8 represents an example of an effective index of a guided mode taking into account different parameters within manufacturing tolerances. The vertical axis represents the effective index of the fundamental transverse electrical (TE) and transverse magnetic (TM) mode in a low index contrast waveguide (e.g., a polymer waveguide) to high index contrast waveguide (e.g., silicon waveguide) adiabatic crossing transition. This is plotted as a function of the high index contrast waveguide taper width for various assumptions on fabrication and assembly tolerances. The crossing of the optical power from one waveguide to the other happens near the inflection point in the effective index profile.

The slope of the profile indicates the rate of change in the mode with increased width. The resulting graph shows that the slopes are much sharper on the left side than the right side of the profile, which indicates that the slope of the taper needs to be slower on the left of the crossing region (i.e., the narrow half) than it is on the right of the crossing region (i.e., the wide half).

Figure 9:
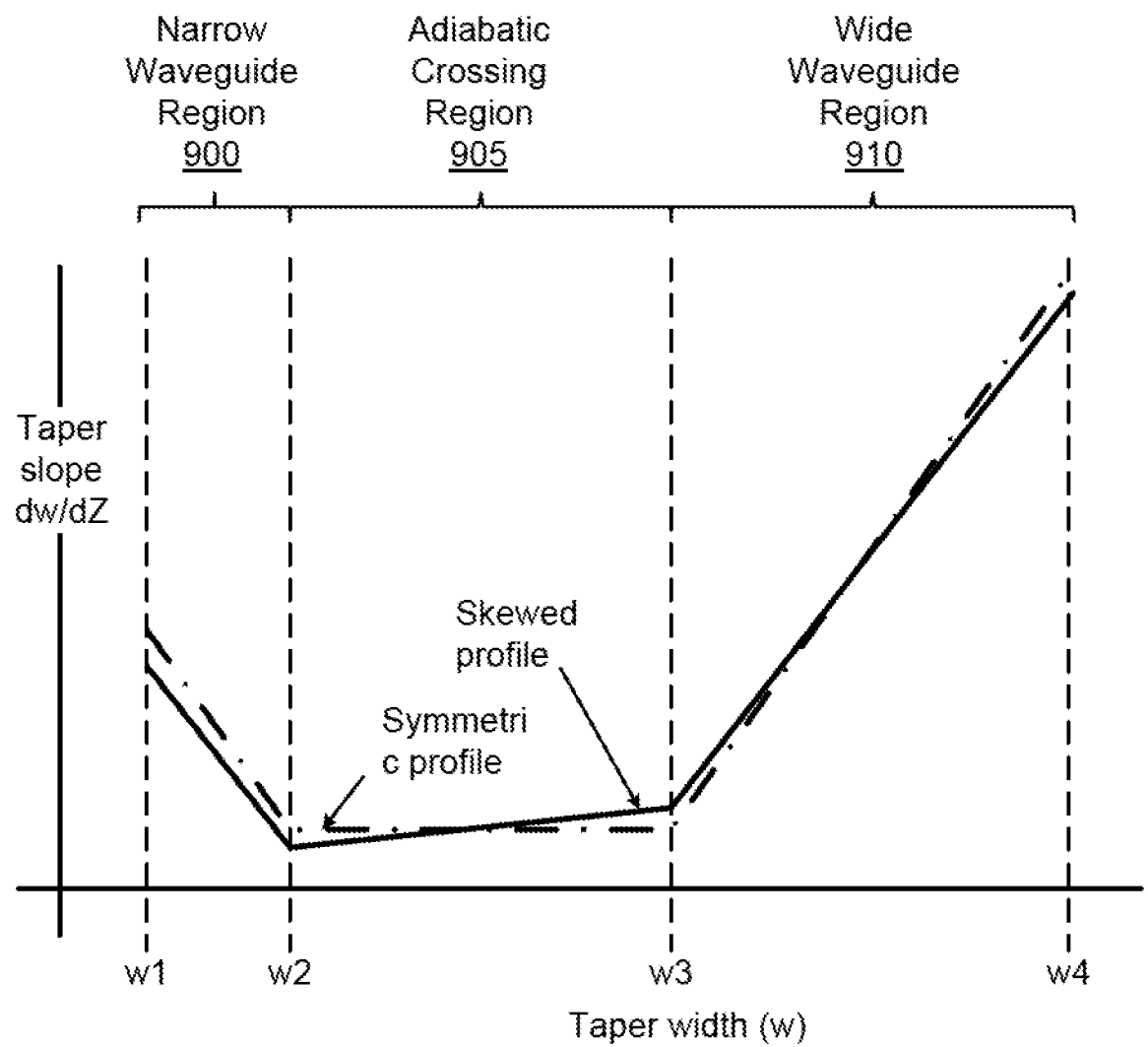
FIG. 9 shows an example of a comparison of a symmetric profile and a skewed profile for a high index contrast waveguide in accordance with aspects of the present disclosure.

FIG. 9 shows an example of a comparison of a symmetric profile and a skewed profile for a high index contrast waveguide in accordance with aspects of the present disclosure. The example shown includes narrow waveguide region 900, adiabatic crossing region 905, and wide waveguide region 910. Narrow waveguide region 900, adiabatic crossing region 905 and wide waveguide region 910 may be depictions of, or include aspects of, the corresponding elements described with reference to FIG. 3.

The vertical axis of the graph of FIG. 9 represents the taper slope (i.e., the change in the width of the high index contrast waveguide core with respect to a change in the position along the waveguide, the position being normalized to the full taper length). The horizontal axis represents the width of the high index contrast waveguide core, which increases monotonically with the length.

As suggested the graph of the effective index of the guided mode under various manufacturing conditions (i.e., FIG. 8 described above), adiabatic crossing region 905 shows an example of a skewed, asymmetric crossing region (bold line), with a symmetric profile included for comparison (i.e., the line with alternating dots and dashes). In other words, FIG. 9 shows the local tapering slope, $$\frac{dw}{dZ},$$

as function of the width of the waveguide, w.

The adiabatic crossing region 905 has a relatively small slope compared to the narrow waveguide region 900 and wide waveguide region 910. Furthermore, within the adiabatic crossing region 905, the slope is smaller on the left (i.e., the narrow portion) and higher on the right (i.e., the wide portion). The adiabatic crossing region 905 comprises a region of finite length (i.e., as opposed to a single point) because the tolerances on fabrication and assembly will create uncertainty on the exact crossing point.

A symmetric taper profile is shown in a dotted line. A novel skewed profile is shown with the bold line. It improves coupling performance. A simple analytical model of the symmetric taper shape may be given by Equation 1 and Equation 2:

$$w = w_0 + A(Z - Z_0)^n + B(Z - Z_0)^1 \quad (1)$$

$$\frac{dw}{dZ} = nA(Z - Z_0)^{n-1} + B \quad (2)$$

where Z is the normalized position along the taper (i.e., normalized so that the maximum length is equal 1), $w_0$ is the crossing width (at plateau center), $Z_0$ is the placement of $w_0$ along $Z_0$, and A, B, and n are fitting parameters.

By contrast, Equations 3 and 4 show a simple analytical model of a skewed taper shape:

$$w = w_0 + A(Z - Z_0)^{n_1} + B(Z - Z_0)^1 + C(Z - Z_0)^{n_2} \quad (3)$$

$$\frac{dw}{dZ} = n_1 A(Z - Z_0)^{n_1-1} + B + n_2 C(Z - Z_0)^{n_2-1} \quad (4)$$

where the width $w_0$ is slightly off plateau center due to the skew, and $n_1$ and $n_1$ are fitting parameters selected to achieve the skew.

Figure 10:
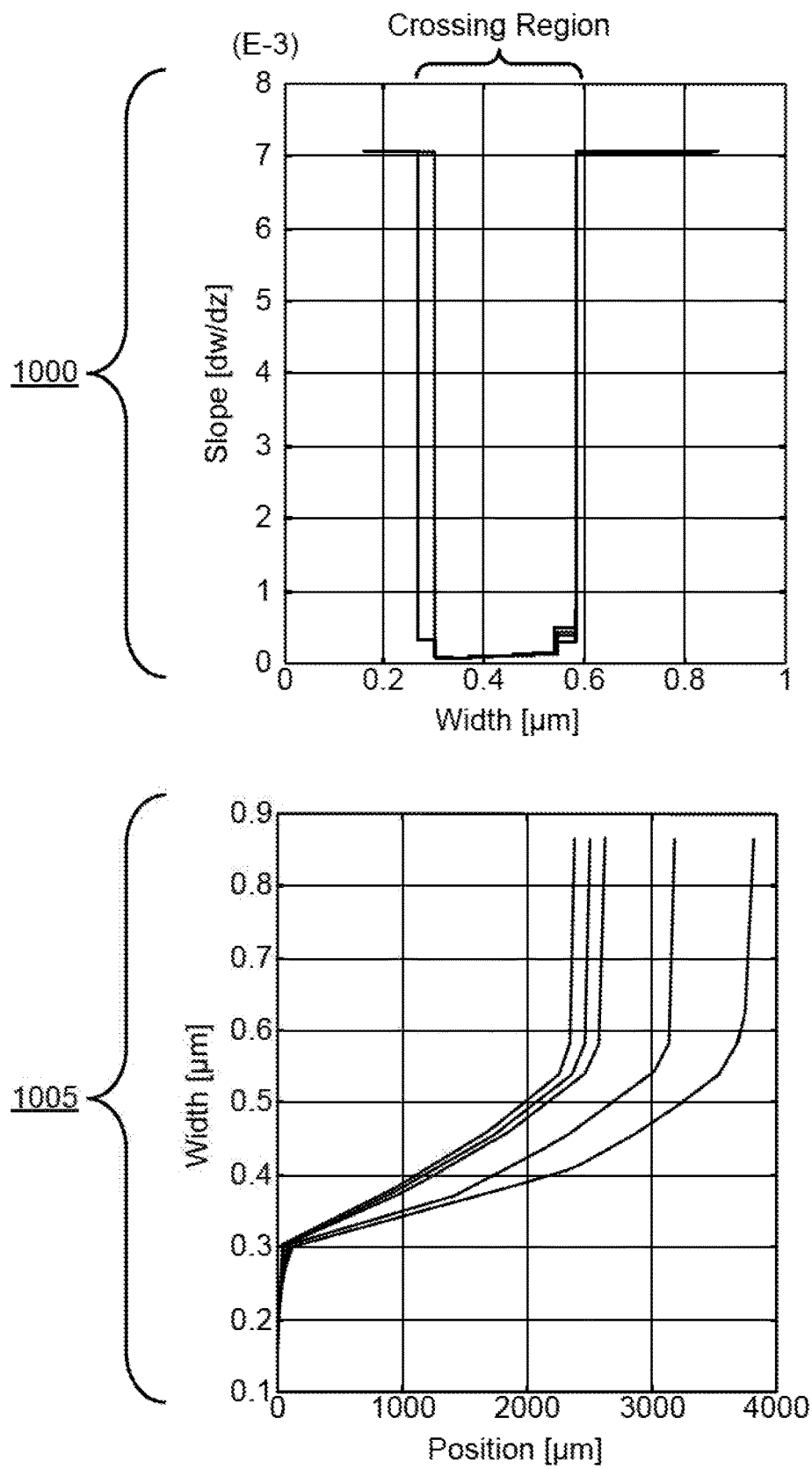
FIG. 10 shows an example of several numerically optimized taper profiles in accordance with aspects of the present disclosure.

FIG. 10 shows an example of several numerically optimized taper profiles in accordance with aspects of the present disclosure. The example shown includes first graph 1000 and second graph 1005. That is, in contrast with the example analytic models described above with reference to FIG. 9, it is possible to plot numerically optimized slope and width values that take into account the manufacturing tolerances and uncertainty regarding the position of the crossing point.

First graph 1000 shows several plots of the slope, $$\frac{dw}{dZ},$$

as s function of the width, w, Z is the normalized position along the taper (i.e., normalized so that the maximum length is equal 1). In an example embodiment, the crossing region corresponds to the region with a slope of less than about 0.3E-3, or about from 0.3 µm to 0.55 µm in width. In each example, the lowest slope is within the narrow-width half of the crossing region.

Second graph 1005 shows the corresponding plots of the width, w, with respect to position along the length (also in µm). In some cases, the initial high slope region on the left of the graph is omitted. The crossing region ends when the width begins to increase sharply near the right hand side of each plot. Within each crossing region, the slop changes (increasing from left to right).

Examples configurations of the slope at various positions along the tapered region of the high index contrast waveguide core are shown below with reference to Tables 3-6.

The examples below may correspond to smooth analytic taper profiles (as shown and described with reference to FIG. 9), or numerically optimized step functions (as shown and described with reference to FIG. 10). In each example, the slope is defined as the derivative of the waveguide width, $w_1$, as a function of the normalized position Z along the optical propagation direction. The width, $w_1$, is expressed in microns. The position, Z, is unit-less and normalized to define the taper from Z=0 to Z=1, with Z=1 being the wide end of the taper, Z1 represents the beginning of each position range, and Z2 corresponds to the end of each range.

The examples skewed taper profiles described in Tables 3-6 are example embodiments, and are not limiting of the present disclosure. The examples may be used in conjunction with any of the cross sectional structures described above with reference to Tables 1 and 2.

However, in one example embodiment, the first example of skewed taper parameters (i.e., Table 3) may be used in conjunction with the HICW Structure 1 of table 2. In another example embodiment, the second example of skewed taper parameters (i.e., Table 4) may be used in conjunction with the HICW Structure 2 of table 2. In another example embodiment, the third example of skewed taper parameters (i.e., Table 5) may be used in conjunction with the HICW Structure 3 of table 2. In another example embodiment, the fourth example of skewed taper parameters (i.e., Table 6) may be used in conjunction with the HICW Structure 4 of table 2.

TABLE 3

First Example of Skewed Taper Parameters

| Z1 (unit-less) | Z2 (unit-less) | slope 1 (um/Z) | slope 2 (um/Z) |
| --- | --- | --- | --- |
| 0.00E+00 | 1.36E−03 | 2.80E−03 | 1.12E−02 |
| 1.36E−03 | 7.43E−02 | 3.11E−05 | 1.24E−04 |
| 7.43E−02 | 1.55E−01 | 1.40E−05 | 5.60E−05 |
| 1.55E−01 | 2.68E−01 | 1.34E−05 | 5.35E−05 |
| 2.68E−01 | 3.58E−01 | 1.27E−05 | 5.09E−.05 |
| 3.58E−01 | 4.47E−01 | 1.27E−05 | 5.09E−05 |
| 4.47E−01 | 5.36E−01 | 1.27E−05 | 5.09E−05 |
| 5.36E−01 | 6.49E−01 | 1.34E−05 | 5.35E−05 |
| 6.49E−01 | 7.30E−01 | 1.40E−05 | 5.60E−05 |
| 7.30E−01 | 7.94E−01 | 2.37E−05 | 9.49E−05 |
| 7.94E−01 | 8.75E−01 | 3.26E−05 | 1.30E−04 |
| 8.75E−01 | 9.49E−01 | 3.59E−05 | 1.44E−04 |
| 9.49E−01 | 9.82E−01 | 8.00E−05 | 3.20E−04 |
| 9.82E−01 | 9.97E−01 | 3.50E−04 | 1.40E−03 |
| 9.97E−01 | 1.00E+00 | 2.80E−03 | 1.12E−02 |

TABLE 4

Second Example of Skewed Taper Parameters

| Z1 (unit-less) | Z2 (unit-less) | slope 1 (um/Z) | slope 2 (um/Z) |
| --- | --- | --- | --- |
| 0.00E+00 | 5.45E−02 | 6.05E−05 | 2.42E−04 |
| 5.45E−02 | 1.38E−01 | 1.18E−05 | 4.73E−05 |
| 1.38E−01 | 2.49E−01 | 1.18E−05 | 4.73E−05 |
| 2.49E−01 | 3.05E−01 | 1.18E−05 | 4.73E−05 |
| 3.05E−01 | 4.16E−01 | 1.18E−05 | 4.73E−05 |
| 4.16E−01 | 5.27E−01 | 1.18E−05 | 4.73E−05 |
| 5.27E−01 | 6.38E−01 | 1.18E−05 | 4.73E−05 |
| 6.38E−01 | 8.33E−01 | 1.18E−05 | 4.73E−05 |
| 8.33E−01 | 9.22E−01 | 1.48E−05 | 5.91E−05 |
| 9.22E−01 | 9.60E−01 | 3.42E−05 | 1.37E−04 |
| 9.60E−01 | 9.79E−01 | 7.03E−05 | 2.81E−04 |
| 9.79E−01 | 9.90E−01 | 2.36E−04 | 9.45E−04 |

TABLE 4-continued

Second Example of Skewed Taper Parameters

| Z1 (unit-less) | Z2 (unit-less) | slope 1 (um/Z) | slope 2 (um/Z) |
|---|---|---|---|
| 9.90E−01 | 9.97E−01 | 7.65E−04 | 3.06E−03 |
| 9.97E−01 | 1.00E+00 | 2.60E−03 | 1.04E−02 |

TABLE 5

Third Example of Skewed Taper Parameters

| Z1 (unit-less) | Z2 (unit-less) | slope1 (um/Z) | slope 2 (um/Z) |
|---|---|---|---|
| 0.00E+00 | 6.30E−03 | 3.52E−03 | 1.41E−02 |
| 6.30E−03 | 4.47E−01 | 2.52E−05 | 1.01E−04 |
| 4.47E−01 | 5.72E−01 | 4.41E−05 | 1.76E−04 |
| 5.72E−01 | 5.97E−01 | 4.62E−05 | 1.85E−04 |
| 5.97E−01 | 7.34E−01 | 4.83E−05 | 1.93E−04 |
| 7.34E−01 | 8.48E−01 | 5.88E−05 | 2.35E−04 |
| 8.48E−01 | 9.46E−01 | 6.78E−05 | 2.71E−04 |
| 9.46E−01 | 9.87E−01 | 1.60E−04 | 6.41E−04 |
| 9.87E−01 | 1.00E+00 | 3.52E−03 | 1.41E−02 |

TABLE 6

Fourth example of Skewed Taper Parameters

| Z1 (unit-less) | Z2 (unit-less) | slope 1 (um/Z) | stope 2 (um/Z) |
|---|---|---|---|
| 0.00E+00 | 1.46E−03 | 6.25E−03 | 2.50E−02 |
| 1.46E−03 | 1.20E−01 | 6.38E−05 | 2.55E−04 |
| 1.20E−01 | 2.87E−01 | 3.63E−05 | 1.45E−04 |
| 2.87E−01 | 3.62E−01 | 3.99E−05 | 1.59E−04 |
| 3.62E−01 | 5.36E−01 | 4.34E−05 | 1.74E−04 |
| 5.36E−01 | 6.38E−01 | 4.47E−05 | 1.79E−04 |
| 6.38E−01 | 8.02E−01 | 4.60E−05 | 1.84E−04 |
| 8.02E−01 | 9.12E−01 | 6.94E−05 | 2.78E−04 |
| 9.12E−01 | 9.53E−01 | 1.84E−04 | 7.35E−04 |
| 9.53E−01 | 9.86E−01 | 4.46E−04 | 1.79E−03 |
| 9.86E−01 | 9.92E−01 | 4.46E−03 | 1.79E−02 |
| 9.92E−01 | 1.00E+00 | 6.25E−03 | 2.50E−02 |

Figure 11:
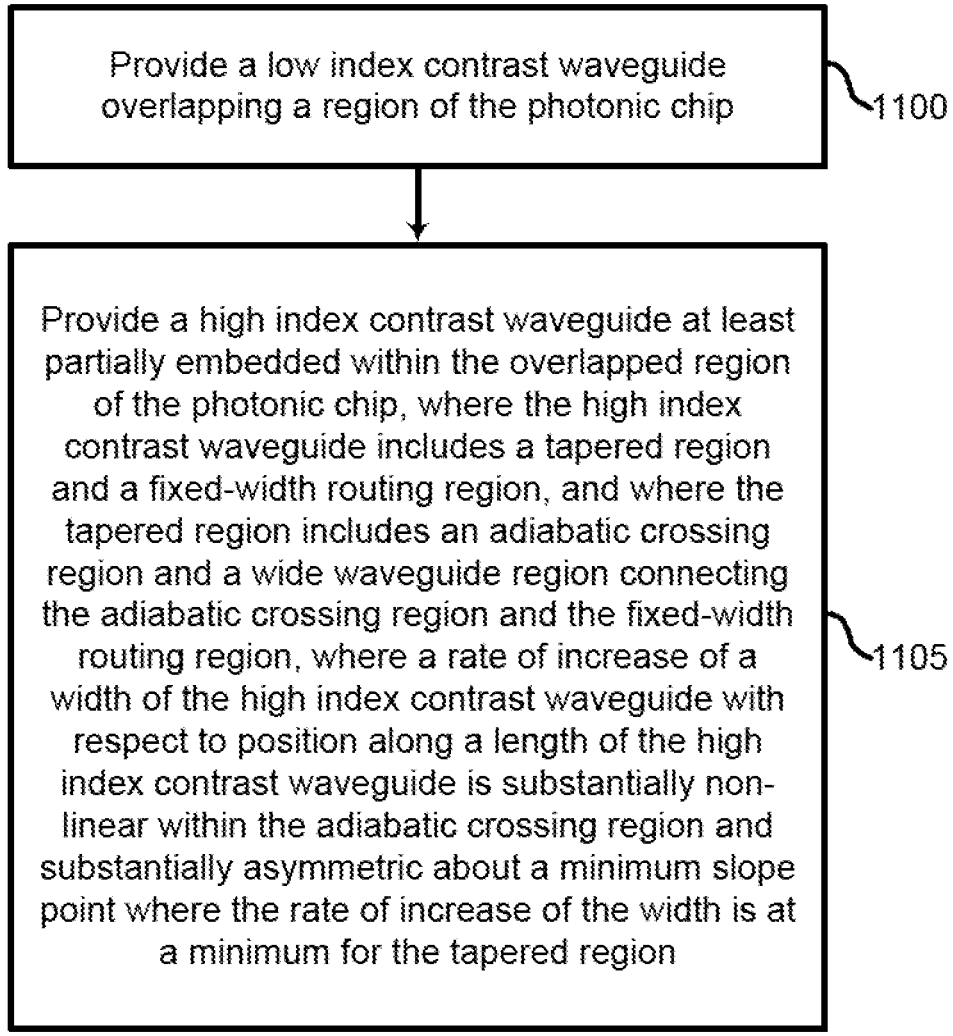
FIG. 11 shows an example of a process for manufacturing an apparatus for coupling a high refractive index contrast waveguide on a photonic chip to an off-chip low refractive index contrast waveguide in accordance with aspects of the present disclosure.

FIG. 11 shows an example of a process for manufacturing an apparatus for coupling a high refractive index contrast waveguide on a photonic chip to an off-chip low refractive index contrast waveguide in accordance with aspects of the present disclosure. In some examples, these operations may be performed by an automated manufacturing system including a processor executing a set of codes. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1100, the manufacturing system may provide a low index contrast waveguide overlapping a region of the photonic chip. In some examples, the manufacturing system may comprise a semiconductor fabrication system.

At step 1105, the manufacturing system may provide a high index contrast waveguide at least partially embedded within the overlapped region of the photonic chip, where the high index contrast waveguide includes a tapered region and a fixed-width routing region, and where the tapered region includes an adiabatic crossing region and a wide waveguide region connecting the adiabatic crossing region and the fixed-width routing region, where a rate of increase of a width of the high index contrast waveguide with respect to position along a length of the high index contrast waveguide is substantially non-linear within the adiabatic crossing region and substantially asymmetric about a minimum slope point where the rate of increase of the width is at a minimum for the tapered region.

Figure 12:
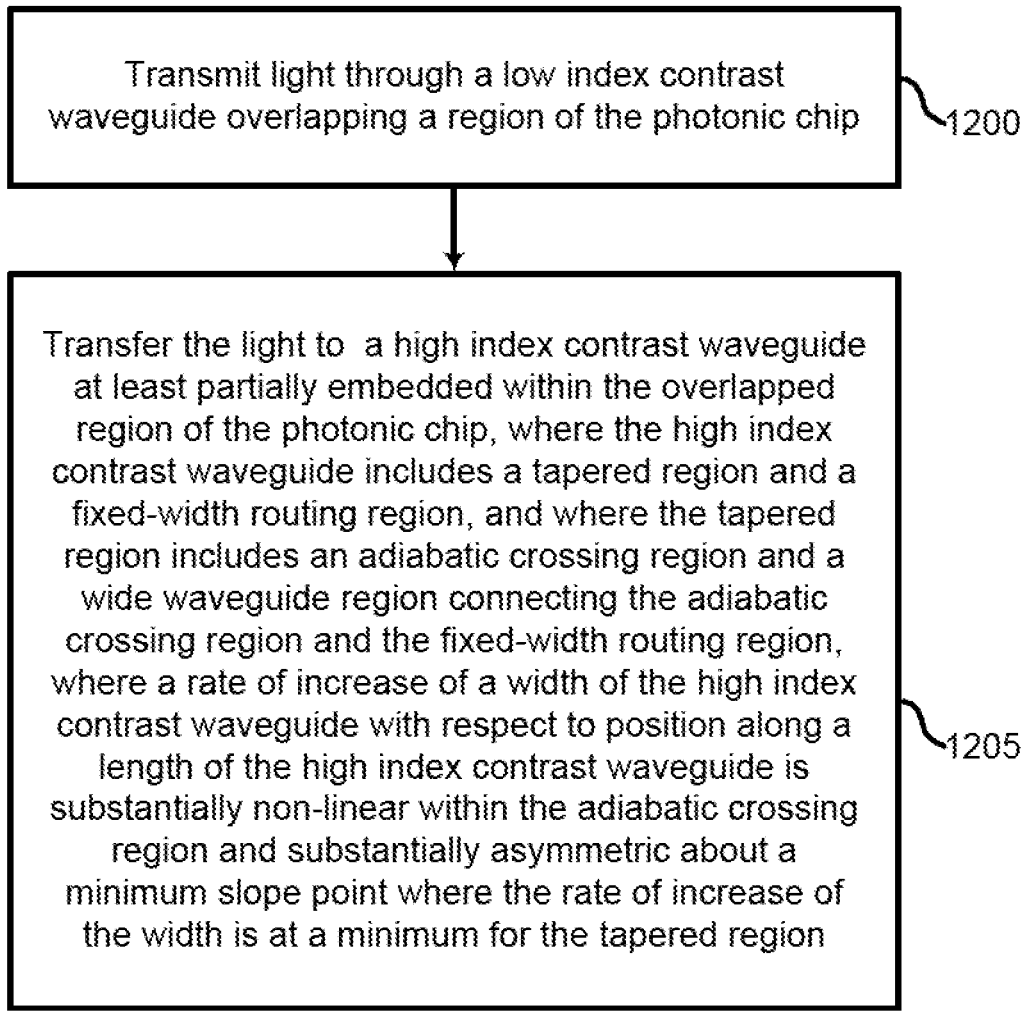
FIG. 12 shows an example of a process for coupling a high refractive index contrast waveguide on a photonic chip to an off-chip low refractive index contrast waveguide in accordance with aspects of the present disclosure.

FIG. 12 shows an example of a process for coupling a high refractive index contrast waveguide on a photonic chip to an off-chip low refractive index contrast waveguide in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1200, the system may transmit light through a low index contrast waveguide overlapping a region of the photonic chip. In some examples, the system transmitting the light comprises a fiber optic communication system.

At step 1205, the system may transfer the light to a high index contrast waveguide at least partially embedded within the overlapped region of the photonic chip, where the high index contrast waveguide includes a tapered region and a fixed-width routing region, and where the tapered region includes an adiabatic crossing region and a wide waveguide region connecting the adiabatic crossing region and the fixed-width routing region, where a rate of increase of a width of the high index contrast waveguide with respect to position along a length of the high index contrast waveguide is substantially non-linear within the adiabatic crossing region and substantially asymmetric about a minimum slope point where the rate of increase of the width is at a minimum for the tapered region.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. An apparatus for coupling optical fiber to a photonic chip, comprising:
   a low index contrast waveguide overlapping a region of the photonic chip;
   a high index contrast waveguide at least partially embedded within the overlapped region of the photonic chip, wherein the high index contrast waveguide comprises a tapered region and a fixed-width routing region, and wherein the tapered region comprises an adiabatic crossing region and a wide waveguide region connecting the adiabatic crossing region and the fixed-width routing region; and
   wherein a rate of increase of a width of the high index contrast waveguide with respect to position along a length of the high index contrast waveguide is substantially non-linear within the adiabatic crossing region and substantially asymmetric about a minimum slope point where the rate of increase of the width is at a minimum for the tapered region.

2. The apparatus of claim 1, wherein:
   the adiabatic crossing region is a continuous region comprising each point of the tapered region such that the rate of increase of the width is within four times a minimum rate of increase of the width with respect to position along the length.

3. The apparatus of claim 1, wherein:
   the adiabatic crossing region has a profile based at least in part on a crossing position uncertainty for the optical mode as related to a fabrication and a relative position tolerance of the high index contrast waveguide and the low index contrast waveguide.

4. The apparatus of claim 3, wherein:
   the fabrication tolerance on the dimensions of the high index contrast waveguide on the photonic chip is at least 10 nm.

5. The apparatus of claim 1, wherein:
   an average of the rate of increase of the width within the adiabatic crossing region is less than 25% of an average of a rate of increase of the width with respect to position along the length in the wide waveguide region.

6. The apparatus of claim 1, wherein:
   the adiabatic crossing region comprises a narrow-width half and a wide-width half, wherein the wide-width half is between the narrow-width half and the wide waveguide region, and wherein the rate increase of the width at each point in the wide-width half is more than 20% greater than the rate increase of the width at the minimum slope point.

7. The apparatus of claim 6, wherein:
   the minimum slope point is located within the narrow-width half of the adiabatic crossing region.

8. The apparatus of claim 1, further comprising:
   an adhesive layer connecting the low index contrast waveguide and the photonic chip, wherein the low index contrast waveguide comprises a polymer core and a polymer cladding.

9. The apparatus of claim 8, wherein:
   at the edge of the photonic chip a refractive index of the high index contrast waveguide core is between 3.2 and 4, a refractive index of the high index contrast waveguide cladding is between 1.35 and 1.5, a refractive index of the polymer cladding is between the refractive index of the high index contrast waveguide cladding and 1.57, a refractive index of the polymer core is between 1.003 and 1.02 times the refractive index of the polymer cladding, a refractive index of the adhesive layer is between 1.45 and the refractive index of the polymer cladding, a height of the high index contrast waveguide core is between 0.12 µm and 0.17 µm, a height of the polymer core is between 1.5 µm and 8 µm, a width of the polymer core is between 5 µm and 15 µm, a thickness of the photonic chip between the high index contrast waveguide and the adhesive layer is less than 1 µm, and a thickness of the adhesive layer between the photonic chip and the low index contrast waveguide is less than 4 µm.

10. The apparatus of claim 9, wherein:
    a lowest rate of increase of the width within the adiabatic crossing region is between 1.27E-05 and 5.09E-05 µm per normalized unit of distance, and a highest rate of increase of the width within the adiabatic crossing region is between 8.00E-05 and 3.20E-04 µm per normalized unit of distance, wherein the normalized unit of distance is a distance from a tapered end of the high index contrast waveguide to a constant width region of the high index contrast waveguide.

11. The apparatus of claim 8, wherein:
    at the edge of the photonic chip a refractive index of the high index contrast waveguide core is between 3.2 and 4, a refractive index of the high index contrast waveguide cladding is between 1.35 and 1.5, a refractive index of the polymer cladding is between the refractive index of the high index contrast waveguide cladding and 1.57, a refractive index of the polymer core is between 1.003 and 1.02 times the refractive index of the polymer cladding, a refractive index of the adhesive layer is between 1.45 and the refractive index of the polymer cladding, a height of the high index contrast waveguide core is between 0.165 µm and 0.24 µm, a height of the polymer core is between 1.5 µm and 8 µm, a width of the polymer core is between 5 µm and 15 µm, a thickness of the photonic chip between the high index contrast waveguide and the adhesive layer is less than 1 µm, and a thickness of the adhesive layer between the photonic chip and the low index contrast waveguide is less than 4 µm.

12. The apparatus of claim 11, wherein:
    a lowest rate of increase of the width within the adiabatic crossing region is between 1.18E-05 and 4.73E-05 µm per normalized unit of distance, and a highest rate of increase of the width within the adiabatic crossing region is between 7.03E-05 and 2.81E-04 µm per normalized unit of distance, wherein the normalized unit of distance is a distance from a tapered end of the high index contrast waveguide to a constant width region of the high index contrast waveguide.

13. The apparatus of claim 8, further comprising:
    a silicon nitride layer within the photonic chip between the low index contrast waveguide and the high index contrast waveguide, wherein a refractive index of the silicon nitride layer is between 1.65 and 2.6 and a thickness of the silicon nitride layer is less than 0.2 µm;
    and wherein at the edge of the photonic chip a refractive index of the high index contrast waveguide core is between 1.8 and 2.4, a refractive index of the high index contrast waveguide cladding is between 1.35 and 1.5, a refractive index of the polymer cladding is between the refractive index of the high index contrast waveguide cladding and 1.57, a refractive index of the polymer core is between 1.003 and 1.02 times the refractive index of the polymer cladding, a refractive index of the adhesive layer is between 1.45 and the refractive index of the polymer cladding, a height of the high index contrast waveguide core is between 0.26 µm and 0.375 µm, a height of the polymer core is between 1.5 µm and 8 µm, a width of the polymer core is between 5 µm and 15 µm, a thickness of the photonic chip between the high index contrast waveguide and the adhesive layer is less than 1 µm, and a thickness of the adhesive layer between the photonic chip and the low index contrast waveguide is less than 4 µm.

14. The apparatus of claim 13, wherein:
at the edge of the photonic chip a refractive index of the high index contrast waveguide core is between 1.8 and 2.4, a refractive index of the high index contrast waveguide cladding is between 1.35 and 1.5, a refractive index of the polymer cladding is between the refractive index of the high index contrast waveguide cladding and 1.57, a refractive index of the polymer core is between 1.003 and 1.02 times the refractive index of the polymer cladding, a refractive index of the adhesive layer is between 1.45 and the refractive index of the polymer cladding, a height of the high index contrast waveguide core is between 0.375 µm and 0.5 µm, a height of the polymer core is between 1.5 µm and 8 µm, a width of the polymer core is between 5 µm and 15 µm, a thickness of the photonic chip between the high index contrast waveguide core and the adhesive layer is less than 1 µm, and a thickness of the adhesive layer between the photonic chip and the low index contrast waveguide is less than 4 µm.

15. The apparatus of claim 14, wherein:
a lowest rate of increase of the width within the adiabatic crossing region is between 3.63E-05 and 1.45E-05 µm per normalized unit of distance, and a highest rate of increase of the width within the adiabatic crossing region is between 4.46E-04 and 1.79E-03 µm per normalized unit of distance, wherein the normalized unit of distance is based a distance from a tapered end of the high index contrast waveguide to a constant width region of the high index contrast waveguide.

16. The apparatus of claim 8, further comprising:
a silicon nitride layer within the photonic chip between the low index contrast waveguide and the high index contrast waveguide, wherein a refractive index of the silicon nitride layer is between 1.65 and 2.6 and a thickness of the silicon nitride layer is less than 0.2 µm;
and wherein a lowest rate of increase of the width within the adiabatic crossing region is between 2.52E-05 and 1.01E-04 µm per normalized unit of distance, and a highest rate of increase of the width within the adiabatic crossing region is between 1.60E-04 and 6.41E-04 µm per normalized unit of distance, wherein the normalized unit of distance is a distance from a tapered end of the high index contrast waveguide to a constant width region of the high index contrast waveguide.

17. An apparatus for coupling optical fiber to a photonic chip, comprising:
a low index contrast waveguide overlapping a region of the photonic chip; and
a high index contrast waveguide at least partially embedded within the overlapped region of the photonic chip, wherein the high index contrast waveguide comprises a tapered region and a fixed-width routing region, and wherein the tapered region comprises an adiabatic crossing region and a wide waveguide region connecting the adiabatic crossing region and the fixed-width routing region,
wherein a rate of increase of a width of the high index contrast waveguide with respect to position along a length of the high index contrast waveguide is substantially non-linear within the adiabatic crossing region and substantially asymmetric about a minimum slope point where the rate of increase of the width is at a minimum for the tapered region,
and wherein the low index contrast waveguide has a refractive index contrast of less than 5%, and the high index contrast waveguide has a refractive index contrast of greater than 5%.

18. An apparatus for coupling optical fiber to a photonic chip, comprising:
a low index contrast waveguide overlapping a region of the photonic chip; and
a high index contrast waveguide at least partially embedded within the overlapped region of the photonic chip, wherein the high index contrast waveguide comprises a tapered region and a fixed-width routing region, and wherein the tapered region comprises an adiabatic crossing region and a wide waveguide region connecting the adiabatic crossing region and the fixed-width routing region,
wherein a rate of increase of a width of the high index contrast waveguide with respect to position along a length of the high index contrast waveguide is substantially non-linear within the adiabatic crossing region and substantially asymmetric about a minimum slope point where the rate of increase of the width is at a minimum for the tapered region,
wherein the tapered region of the high index contrast waveguide further comprises a narrow waveguide region adjacent to the adiabatic crossing region,
and wherein the narrow waveguide region comprises an end of the high index contrast waveguide.

* * * * *